(12) United States Patent
Narasimma Moorthy et al.

(10) Patent No.: US 12,093,702 B2
(45) Date of Patent: Sep. 17, 2024

(54) METHOD AND ELECTRONIC DEVICE FOR MANAGING A BOOST TIME REQUIRED FOR AN APPLICATION LAUNCH

(71) Applicant: Samsung Electronics Co., Ltd., Suwon-si (KR)

(72) Inventors: Naresh Kumar Narasimma Moorthy, Bengaluru (IN); Dwait Bhatt, Bengaluru (IN); Anuradha Kanukotla, Bengaluru (IN); Sripurna Mutalik, Bengaluru (IN); Prateek Bansal, Bengaluru (IN); Jaeho Kim, Suwon-si (KR); Syama Sudheesh, Bengaluru (IN); Renju Chirakarotu Nair, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 17/880,234

(22) Filed: Aug. 3, 2022

(65) Prior Publication Data
US 2023/0045617 A1    Feb. 9, 2023

(30) Foreign Application Priority Data

Aug. 3, 2021 (IN) .............................. 202141034945
Jun. 2, 2022 (IN) .............................. 202241031576
Jul. 26, 2022 (IN) ............................. 2021 41034945

(51) Int. Cl.
G06F 9/445      (2018.01)
G06N 5/022      (2023.01)

(52) U.S. Cl.
CPC ......... *G06F 9/44521* (2013.01); *G06N 5/022* (2013.01)

(58) Field of Classification Search
CPC ........ G06F 9/44521; G06F 1/08; G06F 1/324; G06F 1/3206; G06N 5/022
See application file for complete search history.

(56) References Cited

U.S. PATENT DOCUMENTS

| | | | |
|---|---|---|---|
| 7,903,116 B1 * | 3/2011 | Klock ..................... | G06F 1/324 345/506 |
| 10,891,142 B2 * | 1/2021 | Chen .................... | G06F 9/44578 |
| 11,740,681 B2 * | 8/2023 | Son ......................... | G06F 9/451 713/320 |
| 11,740,687 B2 * | 8/2023 | Kim ...................... | G06F 1/3296 713/320 |

(Continued)

FOREIGN PATENT DOCUMENTS

CN             106406966 B        4/2020

*Primary Examiner* — Aurel Prifti
(74) *Attorney, Agent, or Firm* — Jefferson IP Law, LLP

(57) ABSTRACT

A method for managing a boost time required for an application launch in an electronic device is provided. The method includes detecting, by the electronic device, a user input to launch the application. Further, the method includes measuring, by the electronic device, real-time system health parameters of the electronic device. Further, the method includes predicting, by the electronic device, an application launch time by inputting the real-time system health parameters to an AI-based application prediction model. Further, the method includes boosting, by the electronic device, at least one hardware of the electronic device based on the predicted application launch time.

14 Claims, 32 Drawing Sheets

(56) References Cited

U.S. PATENT DOCUMENTS

| | | | | |
|---|---|---|---|---|
| 2014/0129814 A1* | 5/2014 | Bi | ............... | G06F 9/4401 |
| | | | | 713/1 |
| 2015/0054766 A1* | 2/2015 | Ishida | ............... | G06F 3/04166 |
| | | | | 345/173 |
| 2015/0058646 A1* | 2/2015 | Kim | ............... | G06F 1/3203 |
| | | | | 713/320 |
| 2015/0205636 A1* | 7/2015 | Kulkarni | ............... | G06F 9/4881 |
| | | | | 718/103 |
| 2015/0293701 A1* | 10/2015 | Kim | ............... | G06F 3/0652 |
| | | | | 711/159 |
| 2016/0170944 A1* | 6/2016 | Bell | ............... | G06F 16/958 |
| | | | | 715/760 |
| 2016/0370844 A1* | 12/2016 | Kumar | ............... | G06F 3/0416 |
| 2018/0024849 A1* | 1/2018 | Zhou | ............... | G06F 9/44505 |
| | | | | 713/2 |
| 2019/0272002 A1* | 9/2019 | Seenappa | ............... | G06F 1/324 |
| 2019/0370021 A1* | 12/2019 | Chen | ............... | G06F 9/445 |
| 2020/0065184 A1* | 2/2020 | Channappagoudar | ............... | |
| | | | | G06F 11/0793 |
| 2020/0358685 A1* | 11/2020 | Gupta | ............... | H04L 47/50 |
| 2020/0380033 A1* | 12/2020 | Vyas | ............... | G06F 11/3409 |
| 2023/0009722 A1* | 1/2023 | Lee | ............... | G06F 9/4881 |
| 2023/0138636 A1* | 5/2023 | Liu | ............... | H02J 9/06 |
| | | | | 713/340 |

* cited by examiner

METHOD AND ELECTRONIC DEVICE FOR MANAGING A BOOST TIME REQUIRED FOR AN APPLICATION LAUNCH

CROSS-REFERENCE TO RELATED APPLICATION(S)

This application is based on and claims priority under 35 U.S.C. § 119(a) of an Indian Provisional patent application number 202141034945, filed on Aug. 3, 2021, in the Indian Patent Office, of an Indian Provisional patent application number 202241031576, filed on Jun. 2, 2022, in the Indian Patent Office, of an Indian Complete patent application number 202141034945, filed on Jul. 26, 2022, in the Indian Patent Office, and of an Indian Divisional patent application number 202242042794, filed on Jul. 26, 2022, in the Indian Patent Office, the disclosure of each of which is incorporated by reference herein in its entirety.

BACKGROUND

1. Field

The disclosure relates to a method and an electronic device for managing a boost time required for an application launch. More particularly, the disclosure relates to optimizing an application launch booster for balanced power and performance through an Artificial Intelligence (AI).

2. Description of Related Art

Use of an electronic device (e.g., smartphone and the like) is growing rapidly and the user of the electronic device expect best app experience. Application (aka "App") developers load applications with additional functionalities and better graphical components like high quality images, video, animations leading to higher response time while launching the application. One way to solve this is to identify these scenarios and proactively boost (i.e., increase the operating frequency), a Central Processing Unit (CPU), Graphics Processing Unit (GPU) etc. Since this is done for a fixed period of time, the user of the electronic device ends up consuming more power or end up not achieving the required performance. Also this fixed boosting value differs for each device depending on the performance of a chipset of the electronic device, so that poor performance and a faster battery drain could hurt a brand image of a company or a product.

With increasing complexity of applications, the user of the electronic device observes that the launch time gets impacted adversely. In order to overcome this problem, most of the original equipment manufacturers (OEMs) increase the frequency of the processors for a fixed amount of time. With this a user of the electronic device either see too much battery use in case of lighter applications or end up not achieving the required performance for resource intensive apps like games application.

Further, the duration of boosting is fixed for application launch doesn't factor the nature of the application resulting in frequent over and under boosting. Also, the application launch time reported by an operating system (e.g., Android or the like) accounts only for the first screen, whereas many applications draw multiple screens before the user can actually use the apps. Determining this user perceived launch time (UPLT) is a challenge. Further, also, some applications do load complex libraries/models that enhance the app experience after the launch is complete. This consumes hardware usage and needs to be supported adequately through boosting. Further, different categories of the applications behaving in different ways makes it difficult to fit all the applications in one single model. Also, one model for each app creates space and maintainability issues.

FIG. 1 is an example scenario in which an over boosted scenario is depicted, according to the related art.

Referring to FIG. 1, at scenario S100, a calculator launch time is 140 ms and booster is active for 1 second. Hence, the at least 800 ms of power wastage for the electronic device.

FIG. 2 is an example scenario in which an under boosted scenario is depicted, according to the related art.

Referring to FIG. 2, at scenario S200 the system reports app launch time completed for a first visible window, but many apps shows multiple screen before showing final launching screen as shown in the FIG. 2. The difference between actual and the system reported launch times could be very vast. The framework recorded launch time also varies for different iterations depending on the factors like system load, network etc.

Few applications could finish launching early, but would be running a few important background tasks like loading libraries or models, which enhances the user experience for the app. This increases the usage of CPU/GPU and if these tasks aren't done on time, it would hamper the user interface (UX) for the user. This trend is particularly observed in applications like camera, gallery, etc.

Further, each app shows different behaviour with respect to the hardware resource usage (aka "system resource usage"). Also, need to predict user perceived launch times accurately for different types of applications like.
1. Game Apps (CoD®, PubG®, LiChess® etc),
2. Network related apps (Twitter®, Facebook®, Youtube® etc), and
3. Simple applications (Dialer®, Calculator, Shealth® etc).

All the above different categories of apps could exhibit different characteristics with respect to the hardware resource usage like CPU load, GPU load, number of threads etc. This makes is impossible to fit all apps in a single model and also, using one model for each app creates maintainability and size related issues.

FIG. 3 is an example scenario in which a how framework reported launch time is much less than the user perceived launch time is depicted, according to the related art.

Referring to FIG. 3, at scenario S300, the framework launch time highly underestimates the actual user-perceived launch time. Framework launch time is detected at around 833 ms while a user-perceived launch time (UPLT) is approx. 16-17 s. Hence, the actual launch time is approximately 20× the framework launch time.

FIG. 4 is an example scenario in which the user perceived launch time associated with static loading screen is depicted, according to the related art.

Referring to FIG. 4, at scenario S400, for some application, there would be a static screen for a long time during app launch. For a considerable time of around 8 seconds, the screen remains static on a loading screen.

FIG. 5 is an example scenario in which the user perceived launch time associated with a social networking application connected to a network is depicted, according to the related art.

Referring to FIG. 5, at scenario S500, the first landing page of social networking application (SNS) apps are all different S520, S504 and S506, unlike game apps. This makes prediction difficult when connected to the network.

FIG. 6 is an example scenario in which the user perceived launch time associated with animations on a final screen is depicted, according to the related art.

Referring to FIG. 6, at scenario S600, for some apps, the similarity values with respect to the final image keep changing due to animations and moving objects on the final screen. The character keeps moving and jumping around on the final screen, leading to large changes in similarity ranging across values from 0.5 to 1.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device to optimize application launch booster for balanced power and performance through an Artificial Intelligence (AI).

Another aspect of the disclosure is to manage a boost time required for an application launch in an electronic device.

Another aspect of the disclosure is to optimize invocation of an optimal AI model based on system health parameter of the electronic device.

Another aspect of the disclosure is to predict the user perceived application launch time of the application until the complete user interface (UI) is rendered, based on a system state and decide the time duration for boosting the hardware accordingly.

Another aspect of the disclosure is to provide boosting support beyond application launch, depending on the resource consumption of the application running in the electronic device.

Another aspect of the disclosure is to compute the user-perceived launch time from application launch videos/images using image similarity metrics to compare video frames and using estimated similarity thresholds for launch start and end time.

Another aspect of the disclosure is to check a state of health of the electronic device by determining one or more parameters including a temperature, a battery level, power saving settings and a count of wrong predictions for a scenario/sub-scenario and invoke the AI model only if the one or more parameters exceed a predetermined health threshold of the device. Yet, another object of the embodiments herein is to switch off the AI model and enabling a light-weight model (i.e., static model) based on the count of wrong predictions for that scenario.

Another aspect of the disclosure is to predict the launch time using past data and the current system state, and boost the CPU's for the predicted time period when the user of the electronic device launches the application.

Another aspect of the disclosure is to predict the launch time of the application until 'Window fully drawn event' based on the system state and boost the CPU frequencies accordingly.

Another aspect of the disclosure is to classify the application based on the utilization of resources during application launch through spectral clustering.

Additional aspects will be set forth in part in the description which follows and, in part, will be apparent from the description, or may be learned by practice of the presented embodiments.

In accordance with an aspect of the disclosure, a method for managing a boost time required for an application launch in an electronic device is provided. The method includes detecting, by the electronic device, a user input to launch the application. Further, the method includes measuring, by the electronic device, real-time system health parameters of the electronic device. Further, the method includes predicting, by the electronic device, an application launch time by inputting the real-time system health parameters to an AI-based application prediction model. Further, the method includes boosting, by the electronic device, at least one hardware of the electronic device based on the predicted application launch time (e.g., user perceived launch time).

In an embodiment, the boosting, by the electronic device, the at least one hardware of the electronic device based on the predicted application launch time includes increasing a frequency of the at least one hardware of the electronic device for the predicted application launch time to optimize the boost time for subsequent application launches, where the at least one hardware of the electronic device comprises a CPU, a GPU and a BUS of the electronic device.

In an embodiment, the method includes training the AI-based application prediction model by obtaining, by the electronic device, screen frames of the electronic device for a plurality of application launches while at least one application of the plurality of applications is launched at the electronic device, determining, by the electronic device, a plurality of system health parameters of the electronic device while at least one application of the plurality of applications is launched at the electronic device, determining, by the electronic device, an application launch time of the at least one application based on the screen frames of the electronic device and the plurality of system health parameters, and training, by the electronic device, the AI-based application prediction model with the determined application launch time and the plurality of system health parameters of the electronic device.

In an embodiment, obtaining, by the electronic device, the screen frames of the electronic device for the plurality of application launches includes detecting, by the electronic device, an input to launch at least one application from the plurality of applications at the electronic device, recording, by the electronic device, a video of a screen of the electronic device while the at least one application is launched at the electronic device, and converting, by the electronic device, the video into the screen frames by applying a fixed frame rate on a plurality of frames available in the video.

In an embodiment, determining, by the electronic device, the application launch time of the at least one application for each of the application launch includes determining, by the electronic device, a launch start time (LST) by comparing the screen frames of the electronic device with an initial frame of the electronic device for each application launch of the plurality of application launches, determining, by the electronic device, a launch end time (LET) by comparing the screen frames of the electronic device with a final frame of the electronic device for each application launch of the plurality of application launches, determining, by the electronic device, a difference between the LST and the LET, and determining, by the electronic device, the application launch time of the at least one application for each of the application launch based on the difference between the LST and the LET.

In an embodiment, the LST is determined when a similarity between the screen frames with the initial frame reaches a predefined threshold. The LET is determined when a similarity between the screen frames with the final frame reaches a predefined threshold.

In an embodiment, the system health parameters includes a CPU load of the electronic device, a CPU temperature of the electronic device while the at least one application of the plurality of applications is launched at the electronic device, a GPU load of the electronic device, a GPU temperature of the electronic device while the at least one application of the plurality of applications is launched at the electronic device, a skin temperature of the electronic device while the at least one application of the plurality of applications is launched at the electronic device, a battery level of the electronic device while the at least one application of the plurality of applications is launched at the electronic device, a battery temperature of the electronic device while the at least one application of the plurality of applications is launched at the electronic device, an ultra power saving mode (UPSM) mode of the electronic device while the at least one application of the plurality of applications is launched at the electronic device, Application information of the electronic device while the at least one application of the plurality of applications is launched at the electronic device, a type of the at least one application, a memory utilization level of the electronic device while the at least one application of the plurality of applications is launched at the electronic device, a type of network used at the electronic device while the at least one application of the plurality of applications is launched at the electronic device, a Tx/Rx rate of the electronic device while the at least one application of the plurality of applications is launched at the electronic device, an application memory level of the electronic device while the at least one application of the plurality of applications is launched at the electronic device, an Application thread count of the electronic device while the at least one application of the plurality of applications is launched at the electronic device, and a disk usage of the electronic device while the at least one application of the plurality of applications is launched at the electronic device.

In an embodiment, the at least one real-time system health parameters of the electronic device includes a current CPU load of the electronic device, a current CPU temperature of the electronic device, a current GPU load of the electronic device, a current GPU temperature of the electronic device, a current skin temperature of the electronic device, a current battery level of the electronic device, a current battery temperature of the electronic device, a current UPSM mode of the electronic device, a current Application information of the electronic device, a type of applications running in the electronic device, a current memory utilization level of the electronic device, a type of current network used at the electronic device, a current Tx/Rx rate of the electronic device, a current application memory level of the electronic device, a current Application thread count of the electronic device, and a current disk usage of the electronic device.

In an embodiment, the method includes determining, by the electronic device, an actual launch time of the current application being launched. Further, the method includes determining, by the electronic device, whether the actual application launch time of the subsequent applications matches with the predicted application launch time. Further, the method includes updating, by the electronic device, the AI-based application prediction model in response to determining that the actual application launch time of the subsequent applications does not matches with the predicted application launch time.

In accordance with another aspect of the disclosure, an electronic device for managing a boost time required for an application launch in an electronic device is provided. The electronic device includes an application launch time booster communicatively coupled to a memory and a processor. The application launch time booster is configured to detect a user input to launch the application. Further, the application launch time booster is configured to measure real-time system health parameters of the electronic device. Further, the application launch time booster is configured to predict an application launch time by inputting the real-time system health parameters to an AI-based application prediction model. Further, the application launch time booster is configured to boost at least one hardware of the electronic device based on the predicted application launch time.

In accordance with another aspect of the disclosure, a method for optimizing invocation of an optimal AI Model based on system health parameter of the electronic device is provided. The method includes determining, by the electronic device, a health of the electronic device. Further, the method includes determining, by the electronic device, whether the health of the electronic device of the electronic device meets a health criteria of the electronic device. Further, the method includes performing, by the electronic device, one of enabling an AI model at the electronic device in response to determining that the health of the electronic device does meets the health criteria of the electronic device, and disabling the AI model available at the electronic device and enabling a non-AI model at the electronic device in response to determining that the health of the electronic device does not meets the health criteria of the electronic device.

In an embodiment, determining, by the electronic device, the health of the electronic device includes measuring, by the electronic device, real-time system health parameters of the electronic device, determining, by the electronic device, a count of wrong predictions of application launch time, and determining, by the electronic device, the health of the electronic device based on the real-time system health parameters of the electronic device and the count of wrong predictions of application launch time.

In an embodiment, the at least one real-time system health parameters of the electronic device includes a current CPU temperature of the electronic device, a current GPU temperature of the electronic device, a current skin temperature of the electronic device, a current battery level of the electronic device, a current battery temperature of the electronic device, a current UPSM mode of the electronic device, a current Application information of the electronic device, a current memory utilization level of the electronic device In an embodiment, the method includes predicting, by the electronic device, an application launch time using the AI model when the AI model is enabled in the electronic device. Further, the method includes determining, by the electronic device, an actual application launch time while the application is launched at the electronic device. Further, the method includes determining, by the electronic device, whether the predicted launch time meets the actual application launch time of the electronic device. Further, the method includes performing, by the electronic device, one of determining, by the electronic device, that a number of times incorrect predictions made by the AI model met a threshold when the predicted launch time does not meets the actual application launch time of the electronic device, and switching to the non-AI model to predict the predict the application launch time of applications, and continue using the AI model to predict the application launch time of applications when the predicted launch time does not meets the actual application launch time of the electronic device.

Accordingly, the embodiment herein is to provide an electronic device for optimizing invocation of an optimal AI Model based on system health parameter of the electronic device. The electronic device includes an optimal AI Model invocation controller communicatively coupled to a memory and a processor. The optimal AI model invocation controller is configured to determine a health of the electronic device. Further, the optimal AI model invocation controller is configured to determine whether the health of the electronic device of the electronic device meets a health criteria of the electronic device. Further, the optimal AI model invocation controller is configured to perform one of: enable an AI model at the electronic device in response to determining that the health of the electronic device does meets the health criteria of the electronic device, and disable the AI model available at the electronic device and enabling a non-AI model at the electronic device in response to determining that the health of the electronic device does not meets the health criteria of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
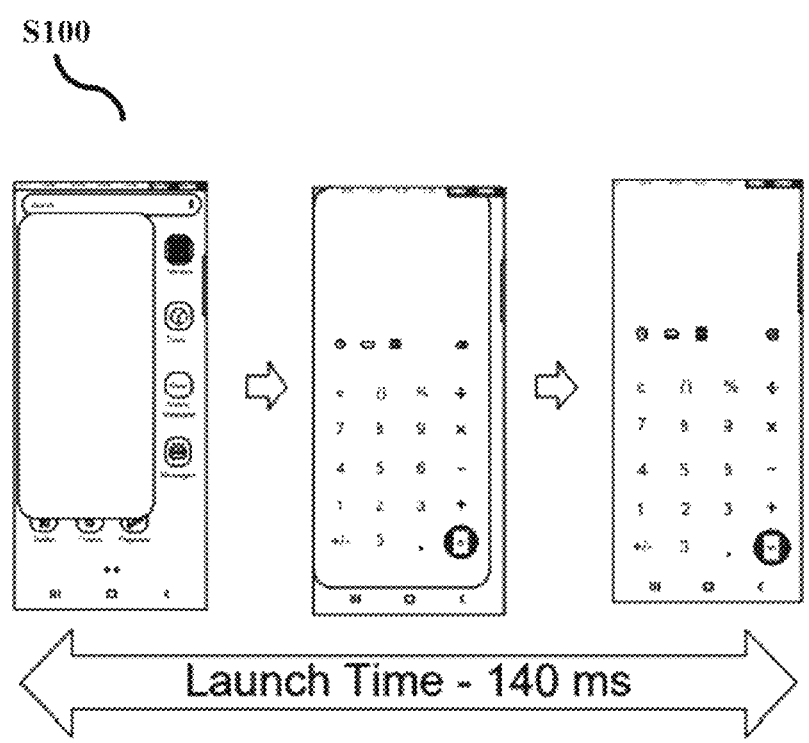
FIG. 1 is an example scenario in which an over boosted scenario is depicted, according to the related art.
Figure 2:
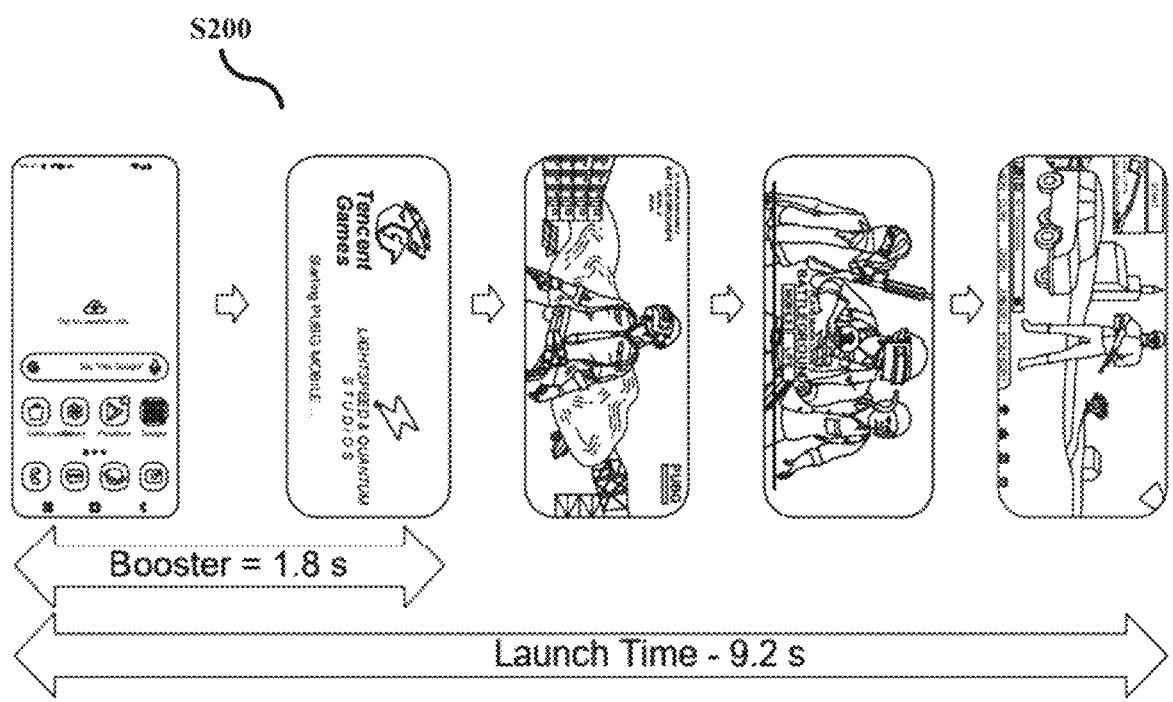
FIG. 2 is an example scenario in which an under boosted scenario is depicted, according to the related art.
Figure 3:
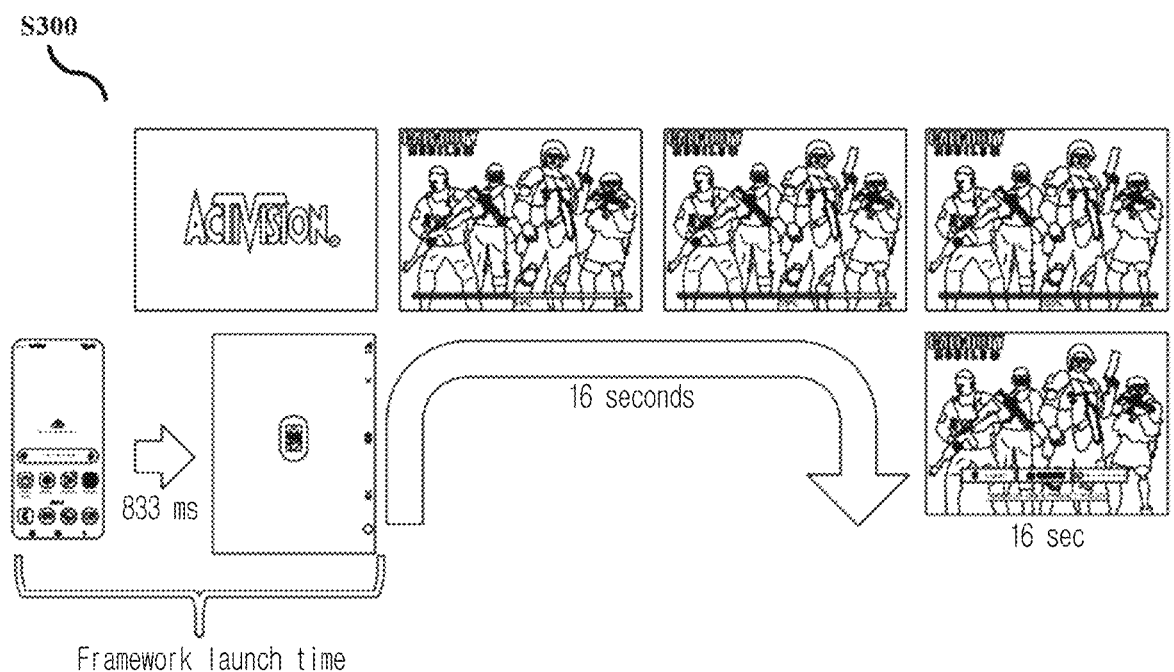
FIG. 3 is an example scenario in which a how framework reported launch time is much less than a user perceived launch time is depicted, according to the related art.
Figure 4:
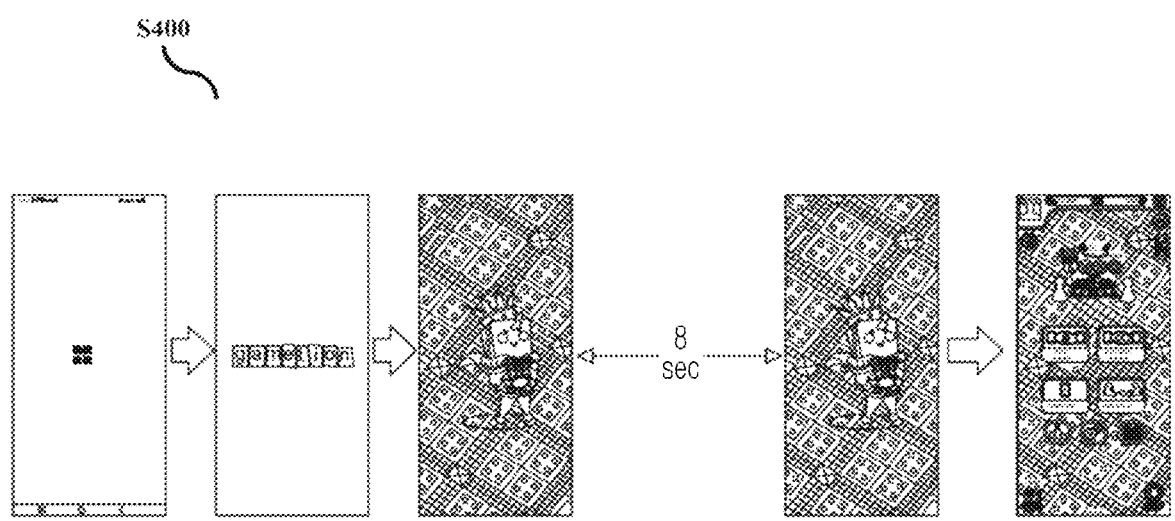
FIG. 4 is an example scenario in which a user perceived launch time associated with static loading screen is depicted, according to the related art.
Figure 5:
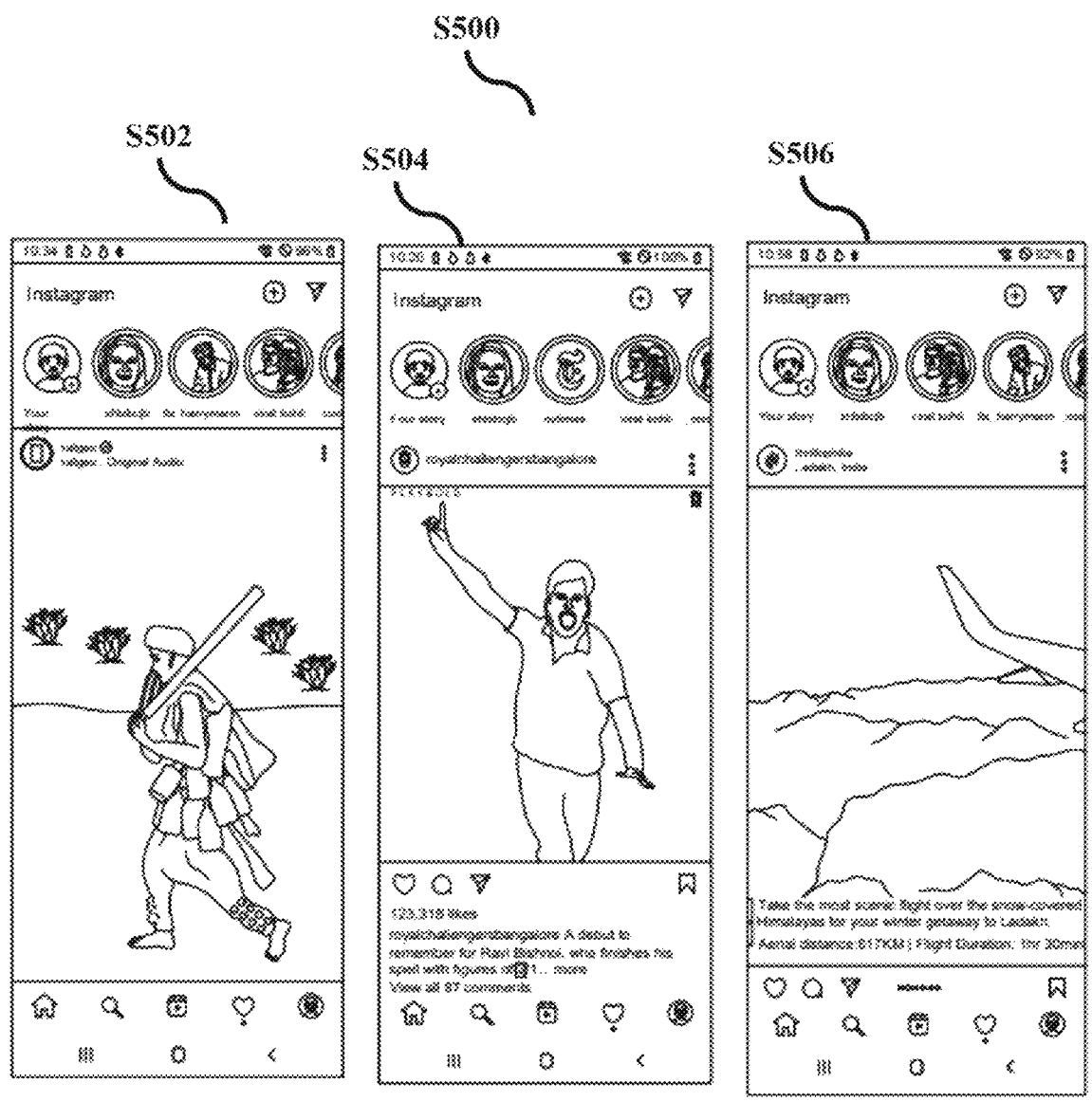
FIG. 5 is an example scenario in which a user perceived launch time associated with a social networking application connected to a network is depicted, according to the related art.
Figure 6:
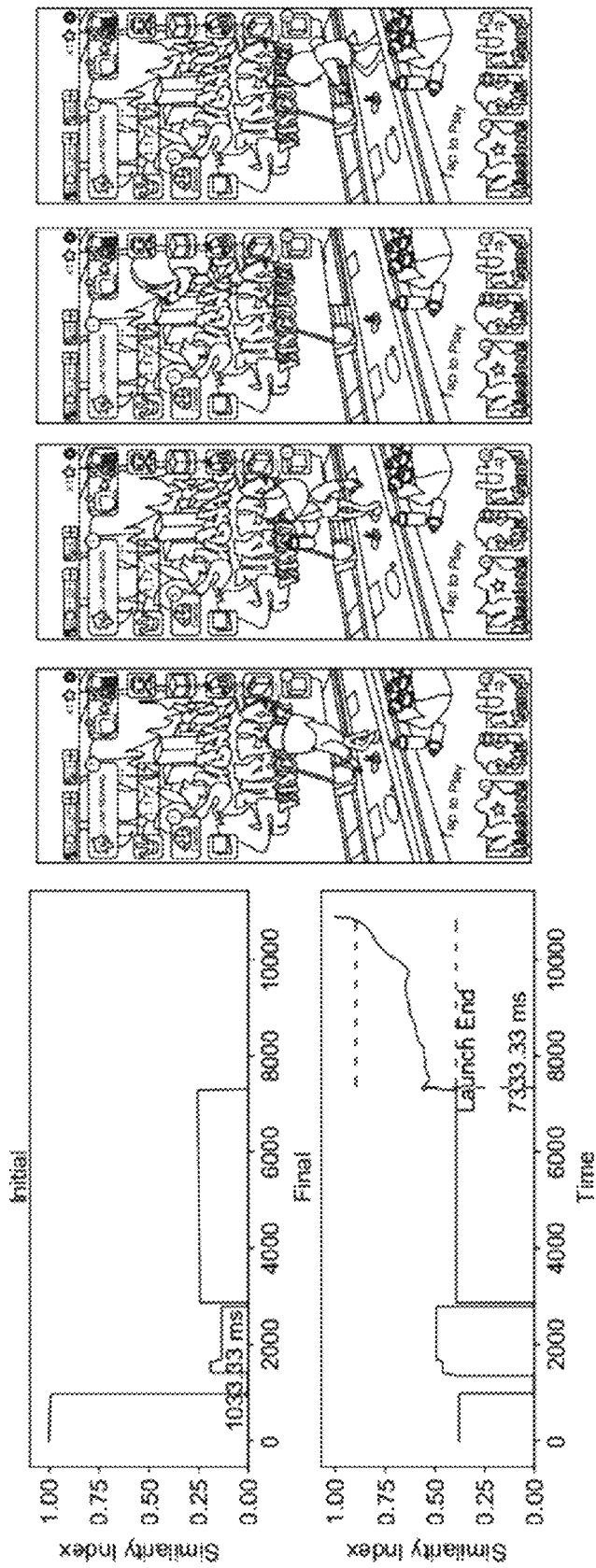
FIG. 6 is an example scenario in which a user perceived launch time associated with animations on a final screen is depicted, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for managing a boost time required for an application launch in an electronic device. The method includes detecting, by the electronic device, a user input to launch the application. Further, the method includes measuring, by the electronic device, real-time system health parameters of the electronic device. Further, the method includes predicting, by the electronic device, an application launch time by inputting the real-time system health parameters to an AI-based application prediction model. Further, the method includes boosting, by the electronic device, at least one hardware of the electronic device based on the predicted application launch time.

The method may be used to optimize application launch booster for balanced power and performance through the AI model. The proposed method predicts the launch time of the application using past history and current system state, and boosts the frequencies accordingly. Further, the method may be used to boost for post launch scenario for resource intensive applications like camera, games etc. depending on the usage of resources.

During an over boosted scenario, the proposed method may be used to remove a static booster, so as to result in saving power (in an example, 800 ms). The power saving will vary based on a type of the application. During an under boosted scenario, the proposed method may be used to boost until the final screen where the user of the electronic device can start playing the application, so as to result in faster application launch time.

By using the ML model, the proposed method may be able to predict and boost the hardware usage very close to the user perceived launch times, predict launch times with better accuracy and increase the performance gain for applications with higher launch times. When the user of the electronic device launches an application, the proposed method will predict the launch time using past data and the current system state, and boost the hardware (e.g., CPU's or the like) for the predicted time period.

The proposed method may be used to compare the similarity metrics for different category of application with the screen remaining static on the loading screen. The proposed method may be used to predict and boosts performance beyond a 'First Windows Visible' for the apps as per their requirement, so as to lead to a better user experience. The proposed method may be used to predict a time interval based on change in system state. The proposed method may be used to predict the dynamic boost time based on system parameters.

The proposed method may be used to assist to invoke the AI model only when the electronic device is in a good state and the AI model is fairly accurate, so as to assist the save extensive data collections and computations. This can help us in conserving more power.

Referring now to the drawings and more particularly to FIGS. 7 to 26, 27A, 27B, 27C, 27D, 27E, and 27F, where similar reference characters denote corresponding features consistently throughout the figures, there are shown preferred embodiments.

Figure 7:
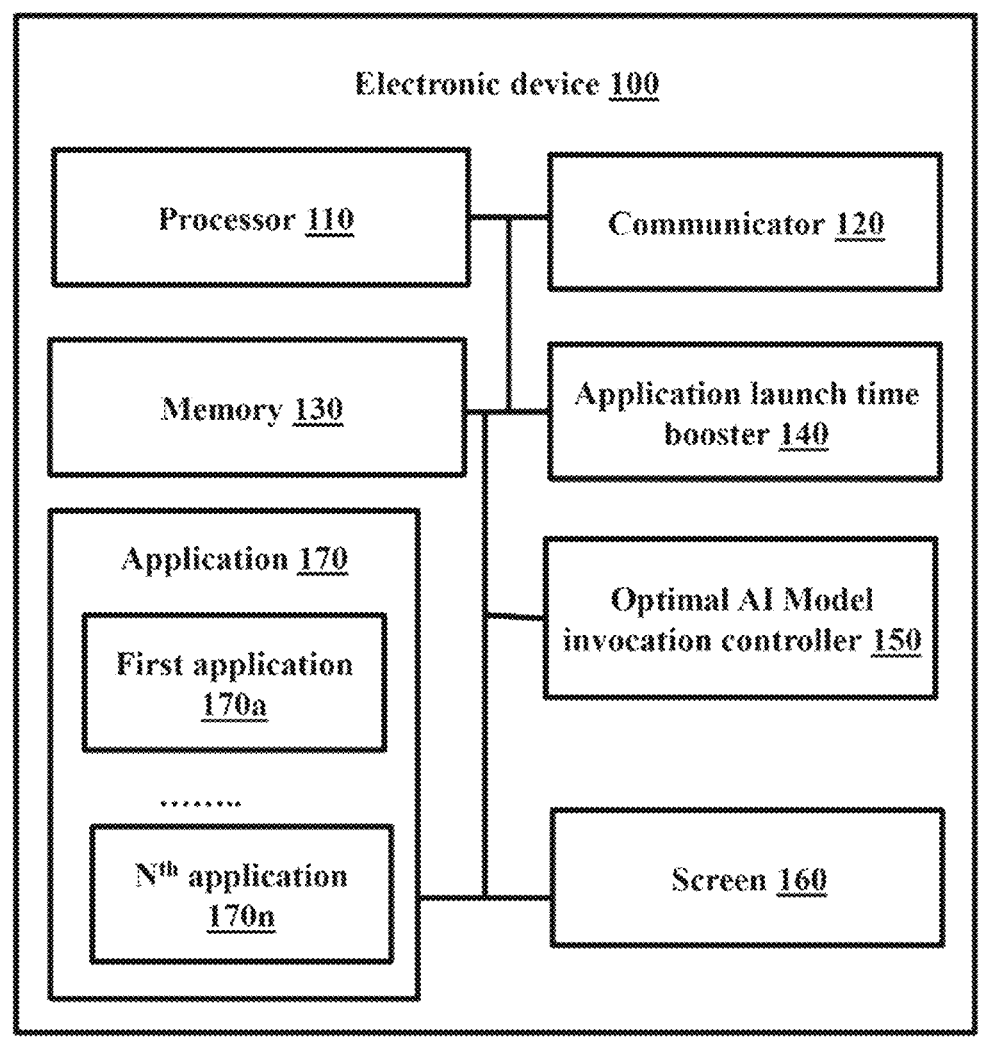
FIG. 7 shows various hardware components of an electronic device, according to an embodiment of the disclosure.

FIG. 7 shows various hardware components of the electronic device, according to an embodiment of the disclosure.

The electronic device 100 may be, for example, but not limited to a cellular phone, a smart phone, a Personal Digital Assistant (PDA), a tablet computer, a laptop computer, an Internet of Things (IoT), embedded systems, edge devices, a vehicle to everything (V2X) device or the like In an embodiment, the electronic device 100 includes a processor 110, a communicator 120, a memory 130, an application launch time booster 140, an optimal AI Model invocation controller 150, a screen 160, and a plurality of applications 170*a*-170*n*. Hereafter, the label of the plurality of applications 170*a*-170*n* is 170. The application may be, for example, but not limited to an image classification application, a camera application, a feature extraction application, a video editing application, a video recording application, a video playback application, a social networking application, a game application, a map application, a booking application, a tracking application or the like. The processor 110 is coupled with the communicator 120, the memory 130, the application launch time booster 140, the optimal AI Model invocation controller 150, the screen 160, and the plurality of applications 170.

The application launch time booster 140 detects a user input to launch the application running in the electronic device 100 and measures real-time system health parameters of the electronic device 100. The real-time system health parameter may be, for example, but not limited to a current CPU load of the electronic device 100, a current CPU temperature of the electronic device 100, a current GPU load of the electronic device 100, a current GPU temperature of the electronic device 100, a current skin temperature of the electronic device 100 (e.g., outer layer of the electronic device 100), a current battery level of the electronic device 100, a current battery temperature of the electronic device 100, a current UPSM mode of the electronic device 100, a current application information of the electronic device 100, a type of applications running in the electronic device 100, a current memory utilization level of the electronic device 100, a type of current network used at the electronic device 100, a current Tx rate of the electronic device 100, a current Rx rate of the electronic device 100, a current application memory level of the electronic device 100, a current application thread count of the electronic device 100, and a current disk usage of the electronic device 100.

Further, the application launch time booster 140 predicts an application launch time by inputting the real-time system health parameters to an AI-based application prediction model. Based on the predicted application launch time (e.g., user perceived launch time or the like), the application launch time booster 140 boosts at least one hardware of the electronic device 100. In an embodiment, the application launch time booster 140 increases a frequency of the at least one hardware of the electronic device 100 for the predicted application launch time to optimize the boost time for the subsequent application launches. The at least one hardware of the electronic device 100 includes a CPU of the electronic device 100, a GPU of the electronic device 100 and a bus of the electronic device 100.

Further, the application launch time booster 140 trains the AI-based application prediction model by obtaining screen frames of the electronic device 100 for a plurality of application launches while at least one application of the plurality of applications 170 is launched at the electronic device 100, determining a plurality of system health parameters of the electronic device 100 while at least one application of the plurality of applications 170 is launched at the electronic device 100, determining an application launch time of the at least one application based on the screen frames of the electronic device 100 and the plurality of system health parameters, and training the AI-based application prediction model with the determined application launch time and the plurality of system health parameters of the electronic device 100. The system health parameters may be, for example, but not limited to a CPU load of the electronic device 100, a CPU temperature of the electronic device 100 while the at least one application of the plurality of applications is launched at the electronic device 100, a GPU load of the electronic device 100, a GPU temperature of the electronic device 100 while the at least one application of the plurality of applications is launched at the electronic device 100, a skin temperature of the electronic device 100 while the at least one application of the plurality of applications is launched at the electronic device 100, a battery level of the electronic device 100 while the at least one application of the plurality of applications is launched at the electronic device 100, a battery temperature of the electronic device 100 while the at least one application of the plurality of applications is launched at the electronic device 100, a Ultra Power Saving Mode (UPSM) mode of the electronic device 100 while the at least one application of the plurality of applications is launched at the electronic device 100, application information of the electronic device 100 while the at least one application of the plurality of applications is launched at the electronic device 100, a type of the at least one application, a memory utilization level of the electronic device 100 while the at least one application of the plurality of applications is launched at the electronic device 100, a type of network used at the electronic device 100 while the at least one application of the plurality of applications is launched at the electronic device 100, a transmitting (Tx) rate while the at least one application of the plurality of applications is launched at the electronic device, a receiving (Rx) rate of the electronic device 100 while the at least one application of the plurality of applications is launched at the electronic device 100, an application memory level of the electronic device 100 while the at least one application of the plurality of applications is launched at the electronic device 100, an application thread count of the electronic device 100 while the at least one application of the plurality of applications 170 is launched at the electronic device 100, and a disk usage of the electronic device 100 while the at least one application of the plurality of applications is launched at the electronic device 100.

In an embodiment, the application launch time booster 140 is configured to obtain the screen frames of the electronic device 100 for the plurality of application launches by detecting an input to launch at least one application from the plurality of applications 170 at the electronic device 100, recording a video of a screen 160 of the electronic device 100 while the at least one application is launched at the electronic device 100, and converting the video into the screen frames by applying a fixed frame rate on a plurality of frames available in the video.

In an embodiment, the application launch time booster 140 is configured to determine the application launch time of the at least one application for each of the application launch by determining a LST by comparing the screen frames of the electronic device 100 with an initial frame of the electronic device 100 for each application launch of the plurality of application launches, determining a LET by comparing the screen frames of the electronic device 100 with a final frame of the electronic device 100 for each application launch of the plurality of application launches, determining a difference between the LST and the LET, and determining the application launch time of the at least one application for each of the application launch based on the difference between the LST and the LET. In an embodiment, the LST is determined when a similarity between the screen frames with the initial frame reaches a predefined threshold, and wherein the LET is determined when a similarity between the screen frames with the final frame reaches a predefined threshold.

Further, the application launch time booster 140 determines an actual launch time of the subsequent applications and determine whether the actual application launch time of the subsequent applications matches with the predicted application launch time. Further, the application launch time booster 140 updates the AI-based application prediction model in response to determining that the actual application launch time of the subsequent applications does not matches with the predicted application launch time.

The optimal AI Model invocation controller 150 determines a health of the electronic device 100. In an embodiment, the optimal AI Model invocation controller 150 measures the real-time system health parameters of the electronic device 100 and determines a count of wrong predictions of application launch time. The real-time system health parameter may be, for example, but not limited to a current CPU temperature of the electronic device 100, a current GPU temperature of the electronic device 100, a current skin temperature of the electronic device 100, a current battery level of the electronic device 100, a current battery temperature of the electronic device 100, a current UPSM mode of the electronic device 100, a current application information of the electronic device 100, and a current memory utilization level of the electronic device 100. Further, the optimal AI Model invocation controller 150 determines the health of the electronic device 100 based on the real-time system health parameters of the electronic device 100 and the count of wrong predictions of application launch time.

Further, the optimal AI Model invocation controller 150 determines whether the health of the electronic device 100 meets the health criteria of the electronic device 100. In response to determining that the health of the electronic device 100 meets the health criteria of the electronic device 100, the optimal AI Model invocation controller 150 enables an AI model at the electronic device 100. In response to determining that the health of the electronic device 100 does not meet the health criteria of the electronic device 100, the optimal AI Model invocation controller 150 disables the AI model available at the electronic device 100 and enabling a non-AI model at the electronic device 100.

The optimal AI Model invocation controller 150 predicts an application launch time using the AI model when the AI model is enabled in the electronic device 100. Further, the optimal AI Model invocation controller 150 determines an actual application launch time while the application is launched at the electronic device 100. Further, the optimal AI Model invocation controller 150 determines whether the predicted launch time meets the actual application launch time of the electronic device 100. Further, the optimal AI Model invocation controller 150 determines that a number of times incorrect predictions made by the AI model met a threshold when the predicted launch time meets the actual application launch time of the electronic device 100, and switching to the non-AI model to predict the predict the application launch time of applications. Further, the optimal AI Model invocation controller 150 continues use the AI model to predict the application launch time of applications when the predicted launch time does not meet the actual application launch time of the electronic device 100.

The application launch time booster 140 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The optimal AI Model invocation controller 150 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 110 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller may be a ML model based controller and AI model based controller. A function associated with the AI model may be performed through the non-volatile memory, the volatile memory, and the processor 110. The processor 110 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 7 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components may be combined together to perform same or substantially similar function in the electronic device 100.

Figure 8:
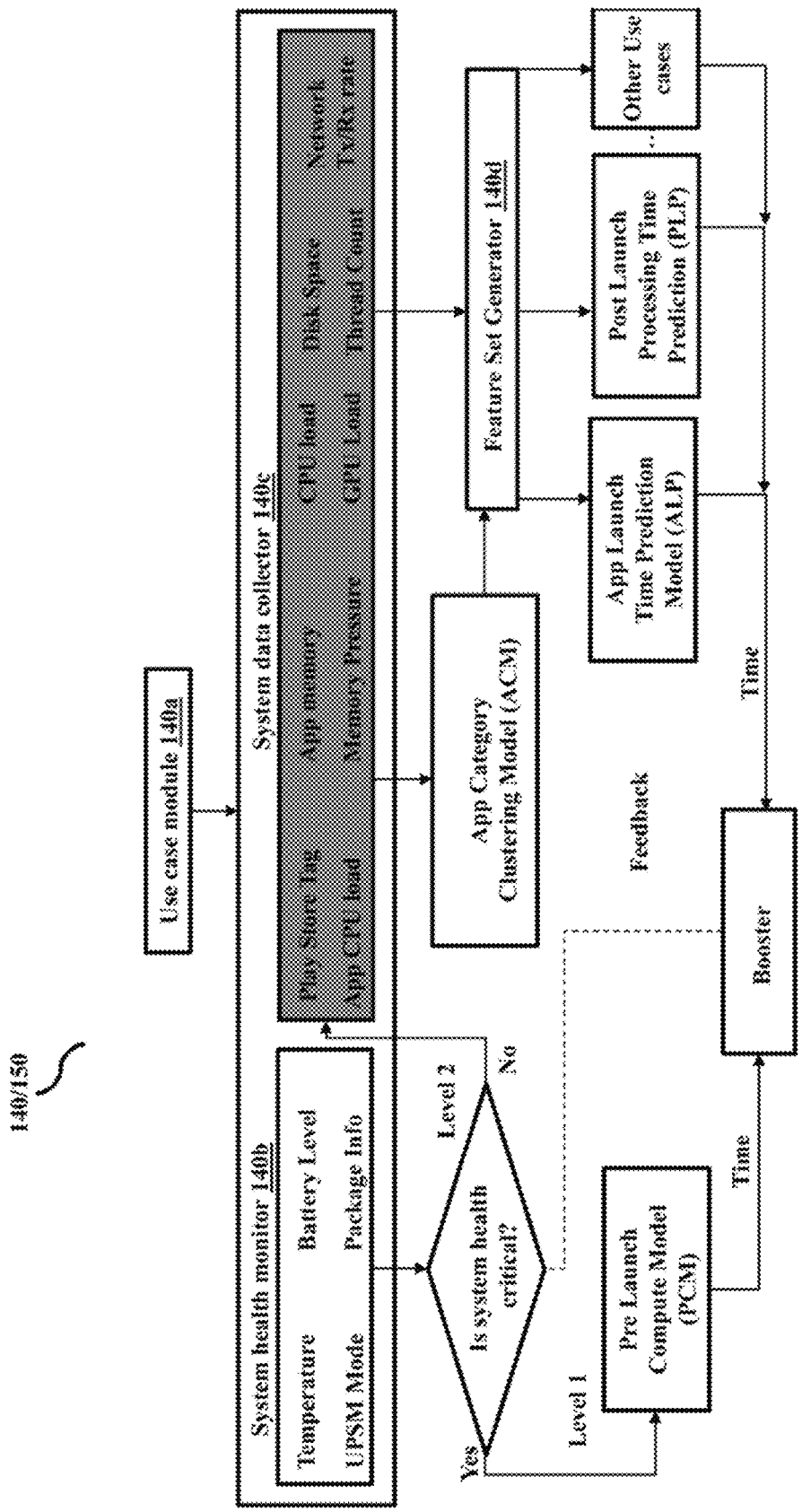
FIGS. 8 and 9 show various hardware components and operations of an application launch time booster/optimal AI Model invocation controller included in an electronic device, according to various embodiments of the disclosure.
Figure 9:
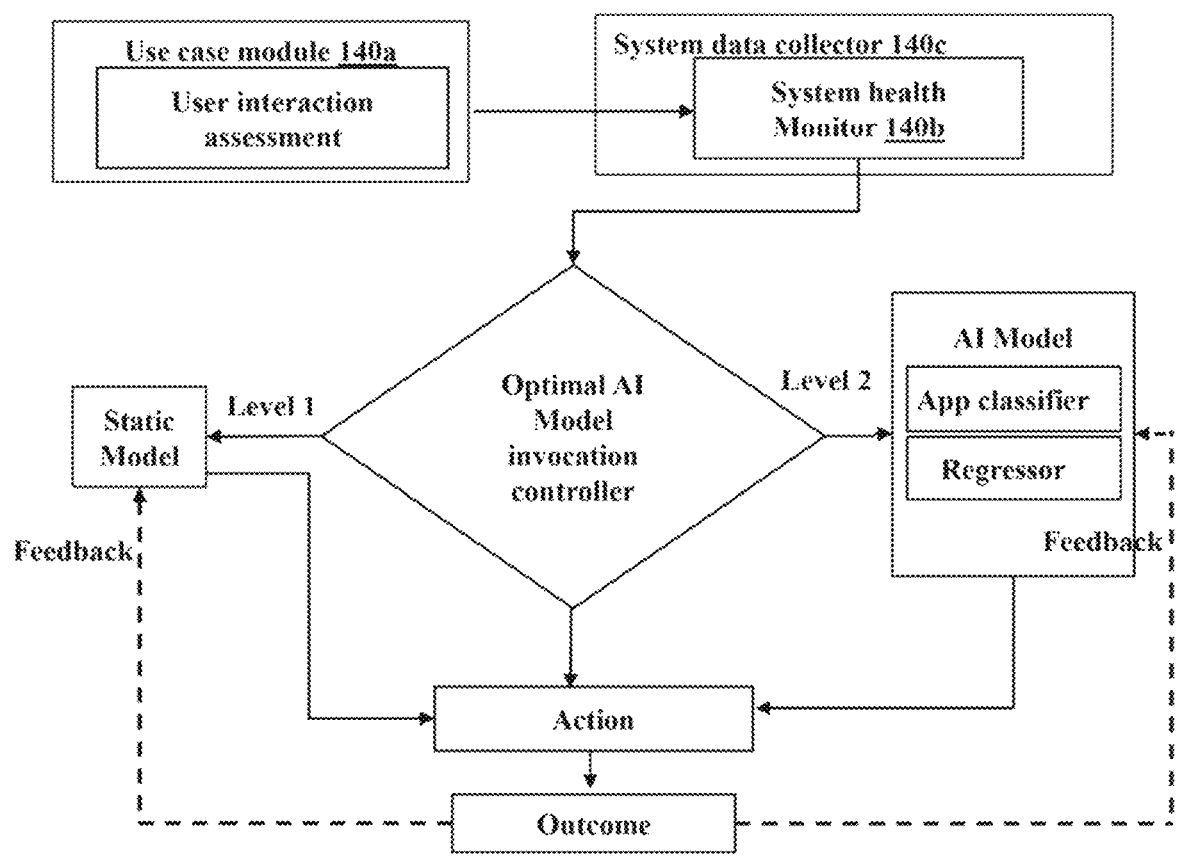

FIGS. 8 and 9 show various hardware components and operations of an application launch time booster/optimal AI Model invocation controller, according to various embodiments of the disclosure.

Referring to FIGS. 8 and 9, the application launch time booster 140/optimal AI Model invocation controller 150 includes an use case module 140*a*, a system health monitor 140*b*, a system data collector 140*c*, and a feature set generator 140*d*.

The use case module 140*a* determines a current use case scenario. The use case scenario may be, for example, but not limited to App launch, booting, scroll, video recording/playback etc. The use case module 140*a* checks a prerequisite conditions for determined current use case scenario. In an example, where the user of the electronic device 100 wants to switch between activities of the same application, the use case module 140a detects the switching and provides the same boosting support as application launch. In another example, the user of the electronic device 100 wants to scroll a long list, the use case module 140a detects the long list and provides boosting support for seamless rendering of the list. In another example, the user of the electronic device 100 wants to stream videos/play resource intensive games, the use case module 140a may provide boosting support depending on the resource usage. In another example, the user is recording a video, the use case module 140a can provide boosting support for seamless recording of videos. The use case module 140a can provide boosting support when the electronic device 100 is booting, depending on the usage of resources.

The system health monitor 140b collects the system data. The system data may be, for example, but not limited to the temperature, UPSM mode, package information and battery charge left. The system data is used to check the system health and decide between a first level operation (aka "level 1 operation") and a second level operation (aka "level 2 operation") using the predictive controller 140e. The first level operation uses the static model and the second level operation would use the AI model. The first level operation doesn't do post launch processing time prediction.

The system data collector 140c is used only when the AI model is being used in the second level operation. The system data collector 140c collects the system data like CPU & GPU load, App specific CPU load, memory pressure, available memory, network info, available disk space, play store tag or the like. The collected data is given as input to the AI model. Further, an app category clustering model (ACM) is generated based on the collected data using the AI model. The collected data is fed to the feature set generator 140d. The feature set generator 140d provides the App launch time prediction model (ALP) and post launch processing time prediction (PLP) using the collected data.

The use case module 140a is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The system health monitor 140b is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The system data collector 140c is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The feature set generator 140d is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Figure 10:
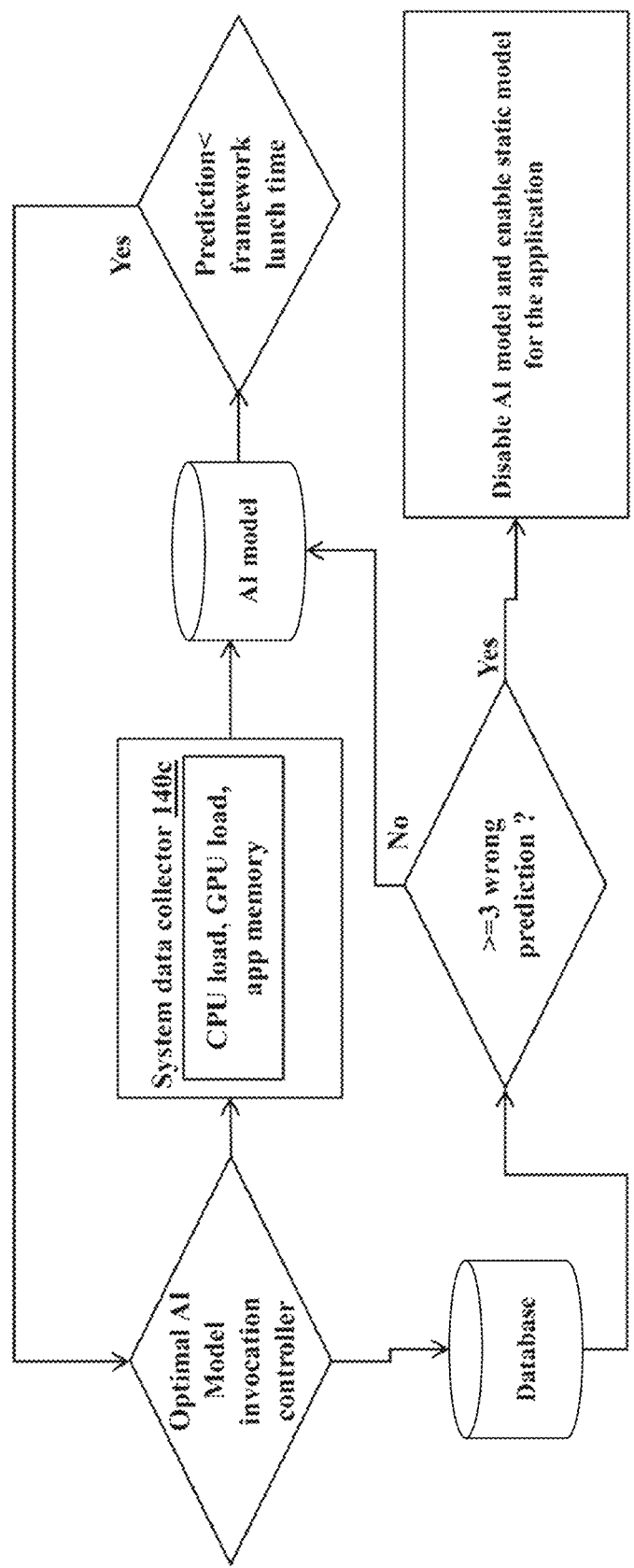
FIG. 10 show various hardware components and operations of an optimal AI model invocation controller included in an electronic device, according to an embodiment of the disclosure.

FIG. 10 show various hardware components and operations of an optimal AI Model invocation controller, according to an embodiment of the disclosure.

Referring to FIG. 10, the optimal AI Model invocation controller 150 enables the AI model at the electronic device 100 in response to determining that the health of the electronic device 100 meets the health criteria of the electronic device 100. The optimal AI Model invocation controller 150 disables the AI model available at the electronic device 100 and enables a non-AI model (e.g., static model) at the electronic device 100 in response to determining that the health of the electronic device 100 does not meets the health criteria of the electronic device 100.

In other words, the optimal AI Model invocation controller 150 measures one or more health parameters of the electronic device 100 including a count of wrong predictions for the application. Further, the optimal AI Model invocation controller 150 checks whether the measured values of one or more parameters exceed a predetermined health threshold of the electronic device 100. Further, the optimal AI Model invocation controller 150 causes the electronic device 100 to invoke the AI model in the electronic device 100 only when the measured values exceed the health threshold.

In other words, the optimal AI Model invocation controller 150 maintains the count of wrong predictions that are way below the framework reported launch times. Further, the model could predict wrong launch times in the event of drastic application or system updates. In such cases, the proposed method falls back to the static model for that particular application and wait for the model to be retrained and pushed from the server for that app.

Figure 11:
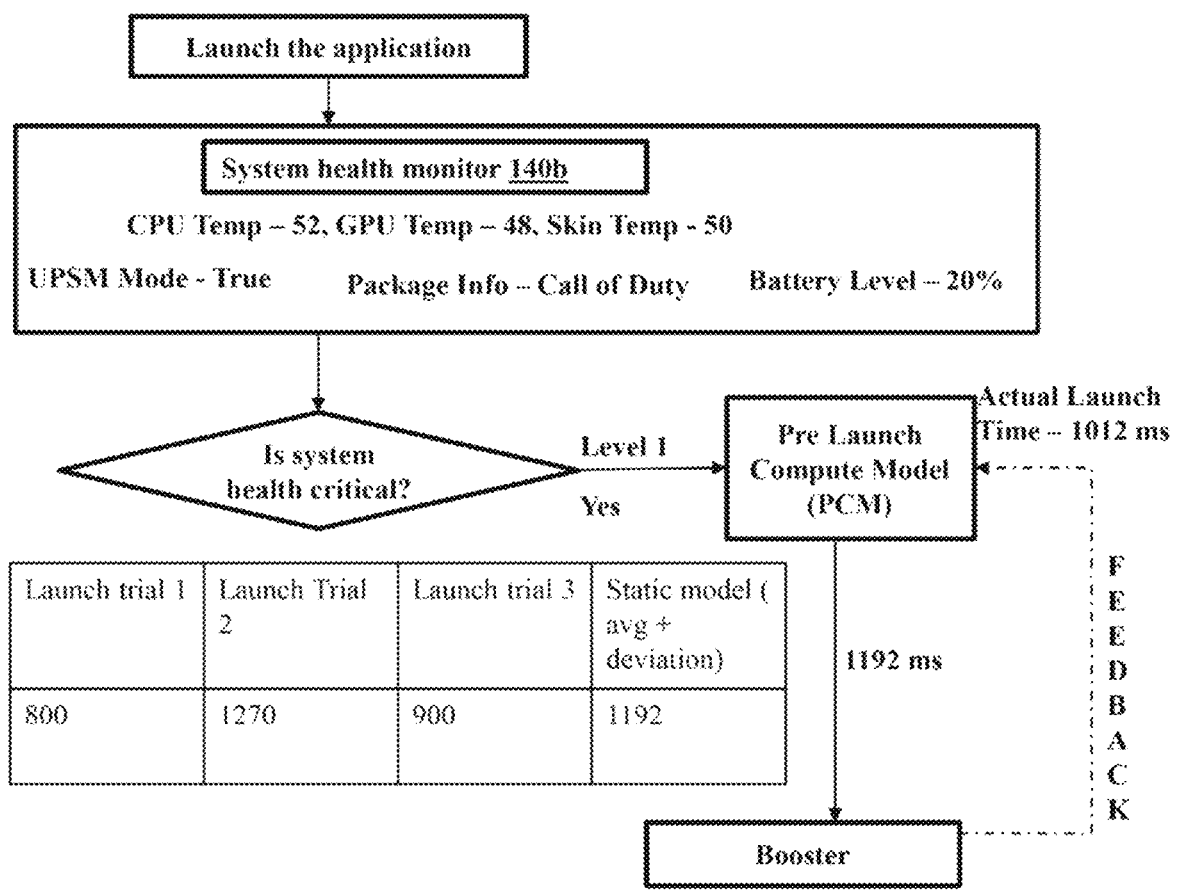
FIG. 11 shows operations of the application launch time booster using a pre-launch compute model, according to an embodiment of the disclosure.

FIG. 11 shows operations of an application launch time booster using a pre-launch compute model, according to an embodiment of the disclosure.

Referring to FIG. 11, the use-case module 140a detects the app launch and schedules collection of the system data. The battery levels are low, various temperatures are high, and the user of the electronic device 100 has put the device in the power saving mode. Based on the proposed method, the first level operation is chosen in order to put less strain on the electronic device 100. The PCM has a lookup table that stores the EMA which is fed to the booster.

As the electronic device 100 is used in first level operation. The first level operation uses recent past history (3-5 iterations) to determine launch time and computes the Exponential Moving Average (EMA) and Standard Deviation (EMSD), hence, the final boosting value would be decided by EMA+2*EMSD. The proposed method covers 95% of the launch times (as per the three-sigma rule). The mathematical relation to compute the EMA and EMSD are as follows, $$\delta_i = x_i - \text{EMA}_{i-1}$$

$$\text{EMA}_i = \text{EMA}_{i-1} + \alpha \cdot \delta_i$$

$$\text{EMSD}_i = \sqrt{(1-\alpha)(\text{EMSD}_{i-1}^2 + \alpha \cdot \delta_i^2)}$$

where, $x_i$ is new launch time reading, $\alpha \in [0, 1]$ is weight assigned to latest launch time reading compared to existing estimate $\text{EMA}_i$.

Figure 12:
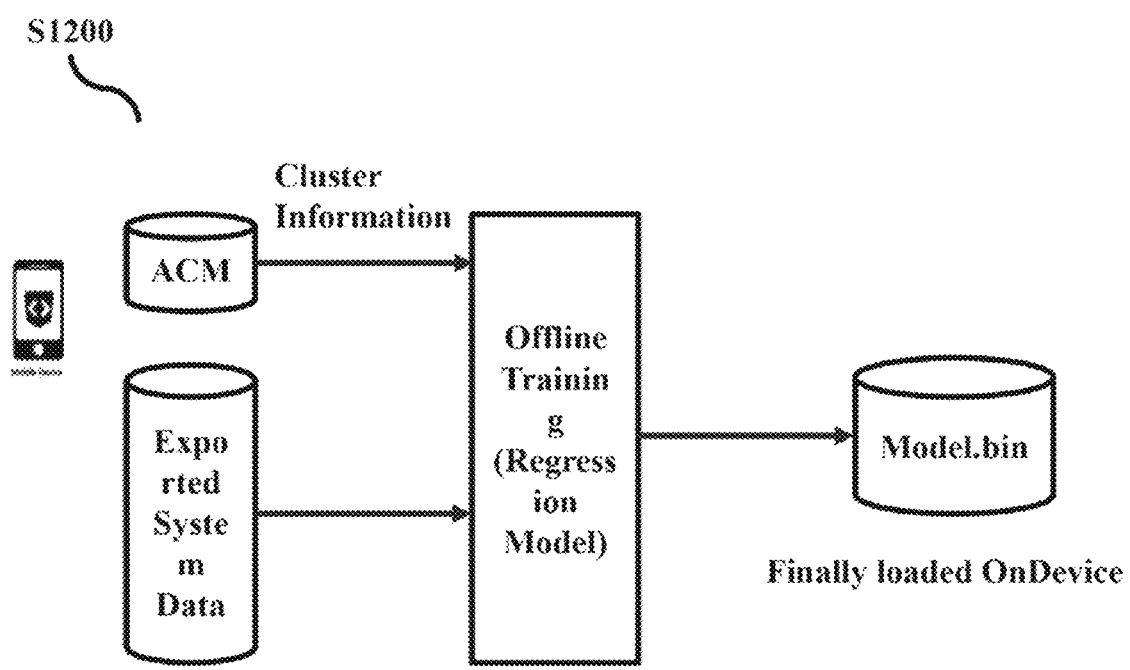
FIG. 12 is an example scenario in which operations of an offline training of an AI model is depicted, according to an embodiment of the disclosure.

FIG. 12 is an example scenario in which operations of an offline training of the AI model is depicted, according to an embodiment of the disclosure.

Referring to FIG. 12, at scenario S1200, the offline training (i.e., regression model) receives the data from the ACM and the exported system data. The model learns and predicts the user perceived application launch time for the give app.

In an example, top applications were chosen across various categories and identified the parameters (e.g., Overall CPU load, App specific CPU load, GPU load, App thread count, Network Tx/Rx Rate, Available Memory, App PSS, Battery percent, Disk usage, Application Launch Time, CPU temperature, GPU temperature, Battery temperature, Game-App flag) to be collected for training purpose during application launch. Further, 25 sets of data were collected by simulating different conditions of available memory and CPU load (controlled by starting different number of threads that could perform intensive CPU operations). Each app was launched for 30 iterations in each dataset. About 2 GB of data was collected. The parameters were collected for 10 seconds during the application launch at an interval of 100 ms. This data is cleaned and pre-processed for training/inference purpose FIG. 13 is an example scenario in which on-device inference of the AI model is depicted, according to an embodiment of the disclosure.

Figure 13:
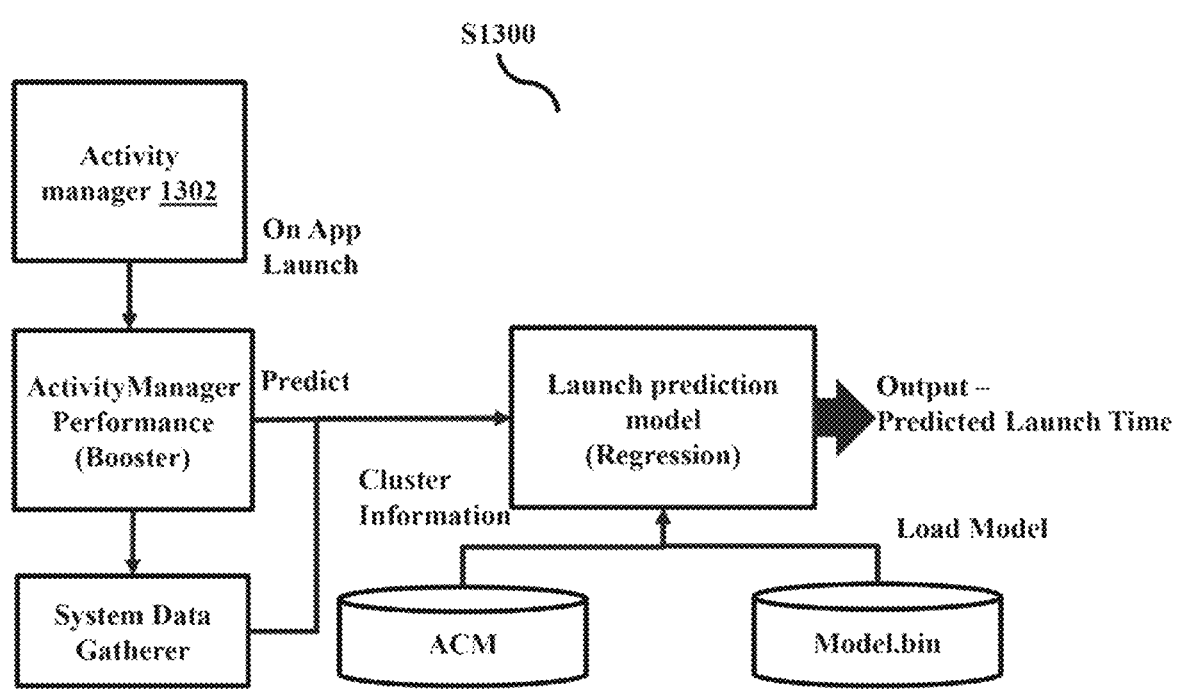
FIG. 13 is an example scenario in which operations of an on-device inference of an AI model is depicted, according to an embodiment of the disclosure.

Referring to FIG. 13, at scenario S1300, the activity manager 1302 detects that the application is launching and summons activity manager performance. This in turn collects the required data which is passed on to a launch prediction model. The launch prediction model loads the AI model which uses the cluster and the system state information to predict the application launch time.

Figure 14:
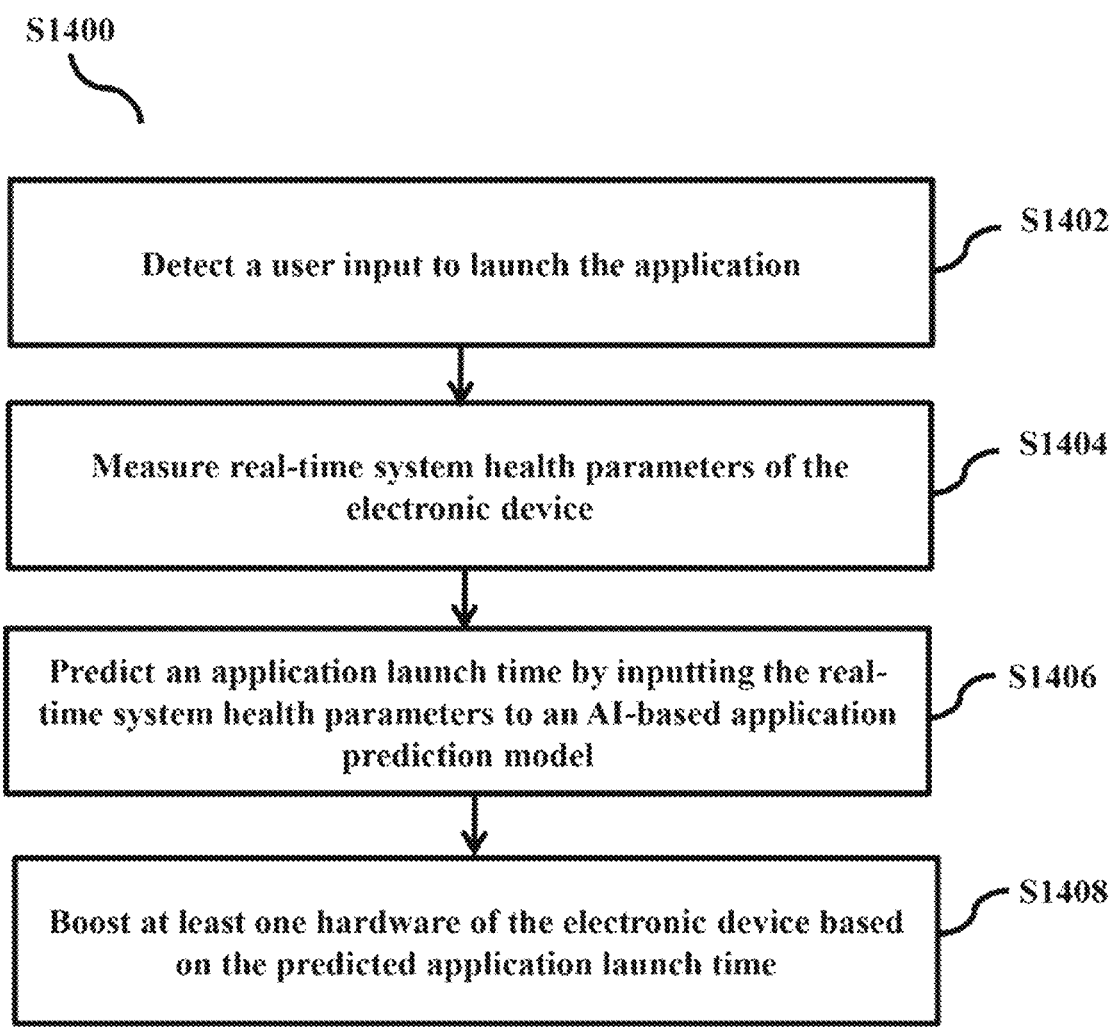
FIG. 14 is a flow chart illustrating a method for managing a boost time required for an application launch in an electronic device, according to an embodiment of the disclosure.

FIG. 14 is a flow chart illustrating a method for managing a boost time required for an application launch in an electronic device, according to an embodiment of the disclosure.

Referring to FIG. 14, in a method S1400, the operations S1402 to S1408 are performed by the application launch time booster 140.

At operation S1402, the method includes detecting the user input to launch the application. At operation S1404, the method includes measuring the real-time system health parameters of the electronic device 100. At operation S1406, the method includes predicting the application launch time by inputting the real-time system health parameters to the AI-based application prediction model. The predicted application launch time is user perceived launch time. At operation S1408, the method includes boosting at least one hardware of the electronic device 100 based on the predicted application launch time.

The method may be used to predict the optimal boosting duration for a scenario (e.g., application launch time) using the past history and current system state and boost the Hardware frequencies accordingly, to achieve optimal performance and power benefits in the electronic device 100. The proposed method may be used to boost until the window fully drawn event, which improves the user interface (UX) by rendering the UI elements faster.

The proposed method may be used to predict and boosts performance beyond the 'First Windows Visible for the apps as per their requirement, so as to lead to a better user experience. The proposed method may be used to predict a time interval based on change in system state. The proposed method may be used to predict the dynamic boost time based on system parameters.

Figure 15:
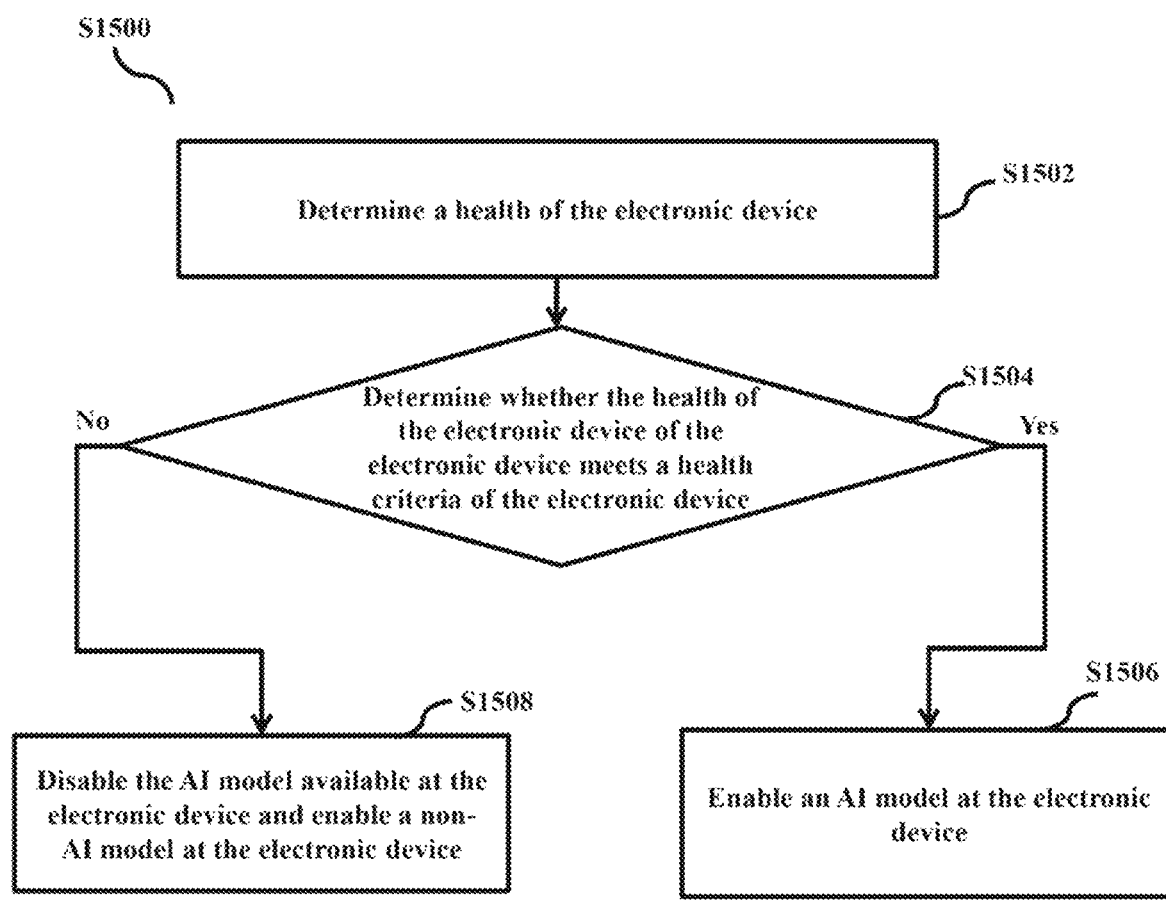
FIG. 15 is a flow chart illustrating a method for optimizing invocation of an optimal AI model based on a system health parameter of an electronic device, according to an embodiment of the disclosure.

FIG. 15 is a flow chart illustrating a method for optimizing invocation of an optimal AI model based on a system health parameter of an electronic device, according to an embodiment of the disclosure.

Referring to FIG. 15, in a method S1500, operations S1502 to S1508 are performed by the optimal AI Model invocation controller 150.

At operation S1502, the method includes determining the health of the electronic device 100. At operation S1502, the method includes determining whether the health of the electronic device 100 meets the health criteria of the electronic device 100. In response to determining that the health of the electronic device 100 meets the health criteria of the electronic device 100, at operation S1506, the method includes enabling the AI model at the electronic device 100. In response to determining that the health of the electronic device 100 does not meets the health criteria of the electronic device, at operation S1508, the method includes disabling the AI model available at the electronic device 100 and enabling a non-AI model (e.g., static model) at the electronic device 100.

Based on the system health parameters, the proposed method can invoke the AI model that predicts the app that is likely to be launched and pre-launch the same in the background of the electronic device 100.

Figure 16:
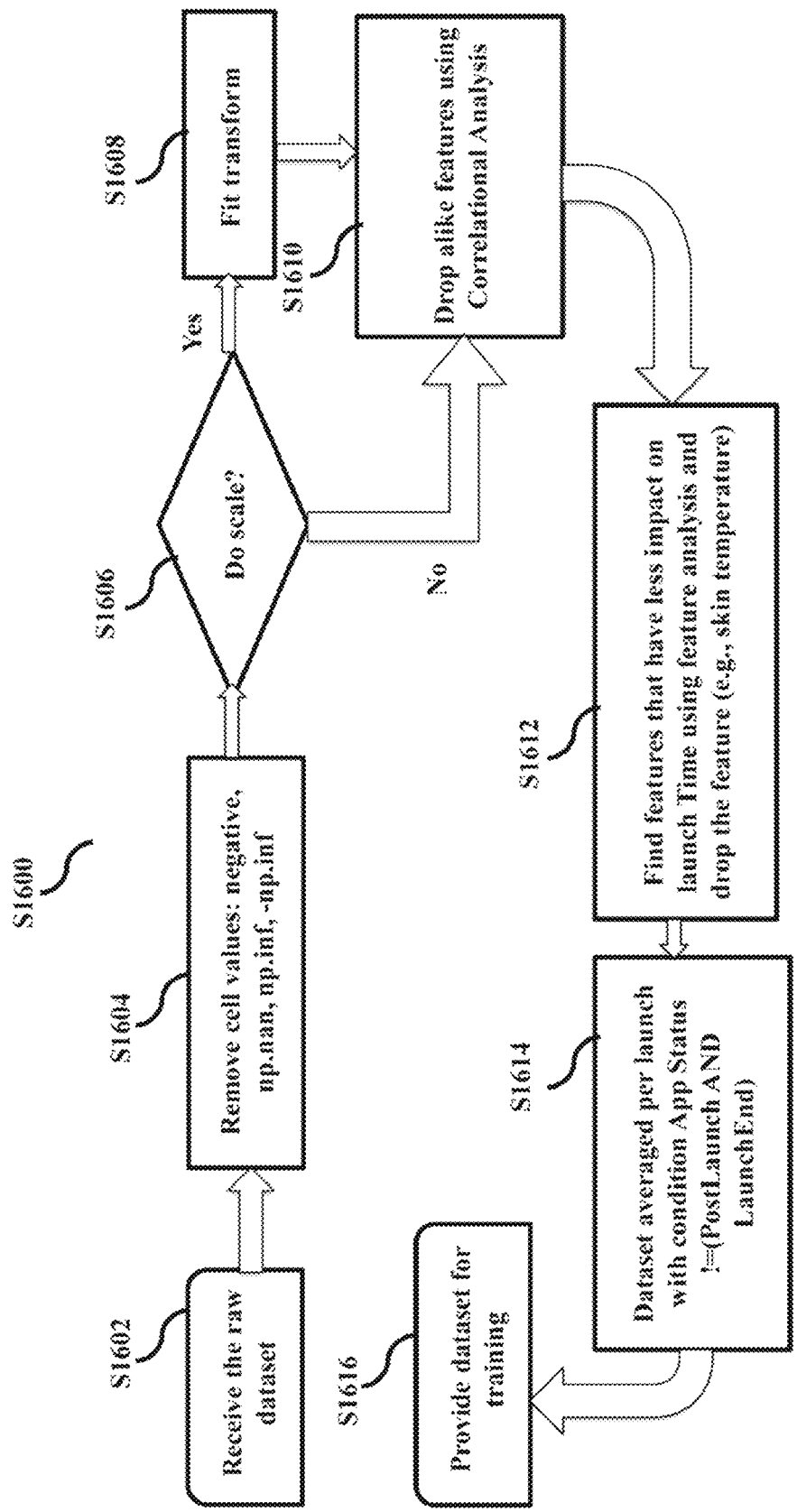
FIG. 16 is a flow chart illustrating data pre-processing operations during an offline training, according to an embodiment of the disclosure.

FIG. 16 is a flow chart illustrating a data Pre-processing operations, according to an embodiment of the disclosure.

Referring to FIG. 16, in a method S1600, at operation S1602, receiving the raw dataset. At operation S1604, the method includes remove cell values (e.g., negative, np.nan, np.inf, -np.inf or the like). At operation S1606, the method includes determining the scaling is required? If the scaling is required then, at operation S1608, the method includes fitting the transform. If the scaling is not required then, at operation S1610, the method includes dropping alike features using correlational analysis (e.g., App Rss and App Pss are highly correlated, drop one). At operation S1612, the method includes finding the features that have less impact on launch time using feature analysis and drop the features (e.g., skin temperature). At operation S1614, the method includes providing the dataset averaged per launch with condition App Status !=(PostLaunch AND LaunchEnd). At operation S1616, the method includes providing the dataset for training.

Figure 17:
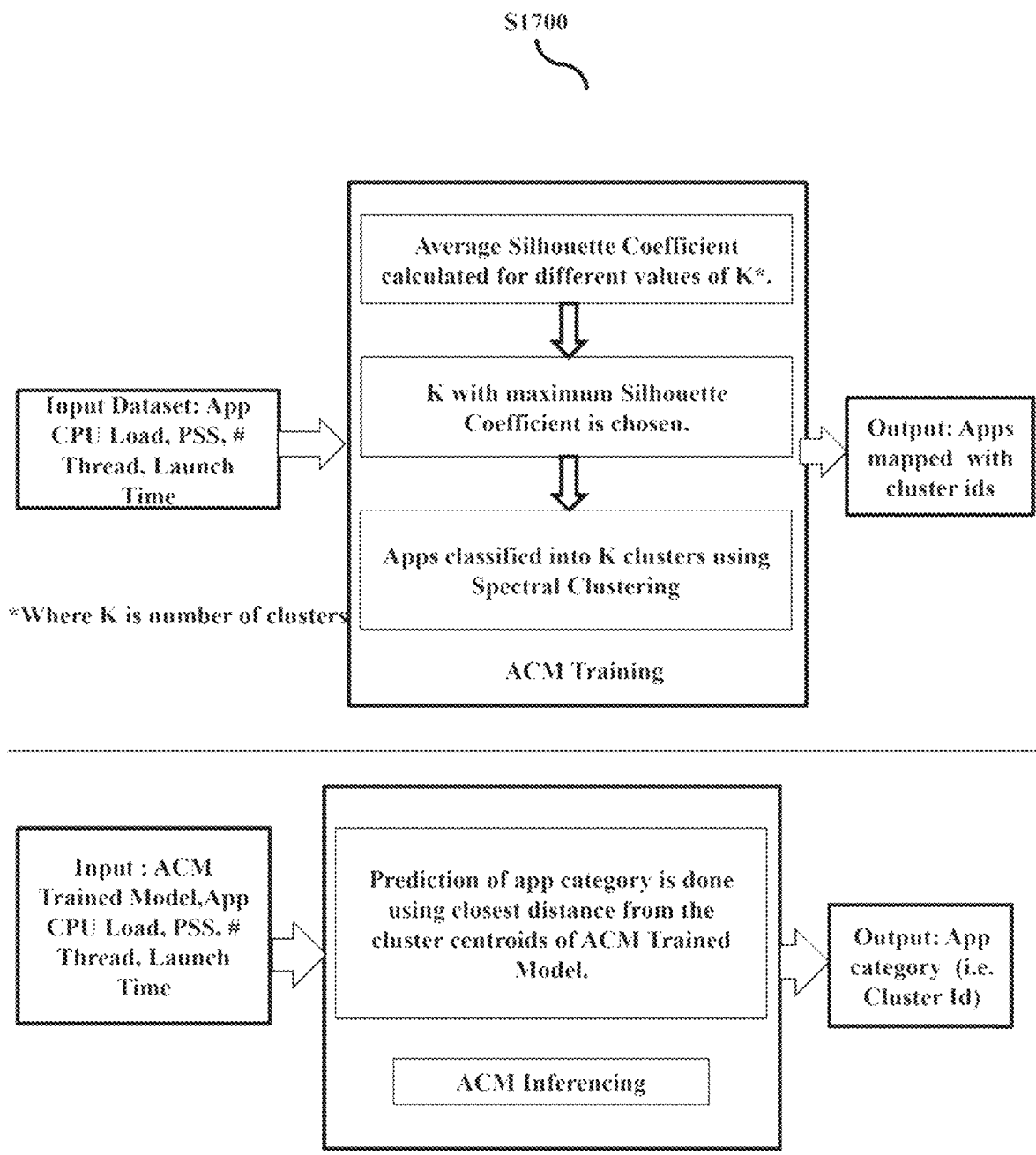
FIG. 17 is an example scenario in which an app category clustering model for an app category clustering model (ACM) training/ACM inference is depicted, according to an embodiment of the disclosure.

FIG. 17 is an example scenario in which an app category clustering model for the ACM training/ACM inference is depicted, according to an embodiment of the disclosure.

Referring to FIG. 17, at scenario S1700, during the ACM training, the electronic device 100 receives the input dataset. Based on the input dataset, the average Silhouette coefficient calculated for different values of K, where K is number of clusters. The K with maximum Silhouette coefficient is chosen. Apps classified into K clusters using the Spectral clustering. The electronic device provides the output in which the Apps is mapped with the cluster identifier (id).

During the ACM Inferencing, the electronic device 100 receives the input of the ACM trained model. The prediction of app category is done using closest distance from the cluster centroids of the ACM trained model. The electronic device provides the output of the app category.

Figure 18:
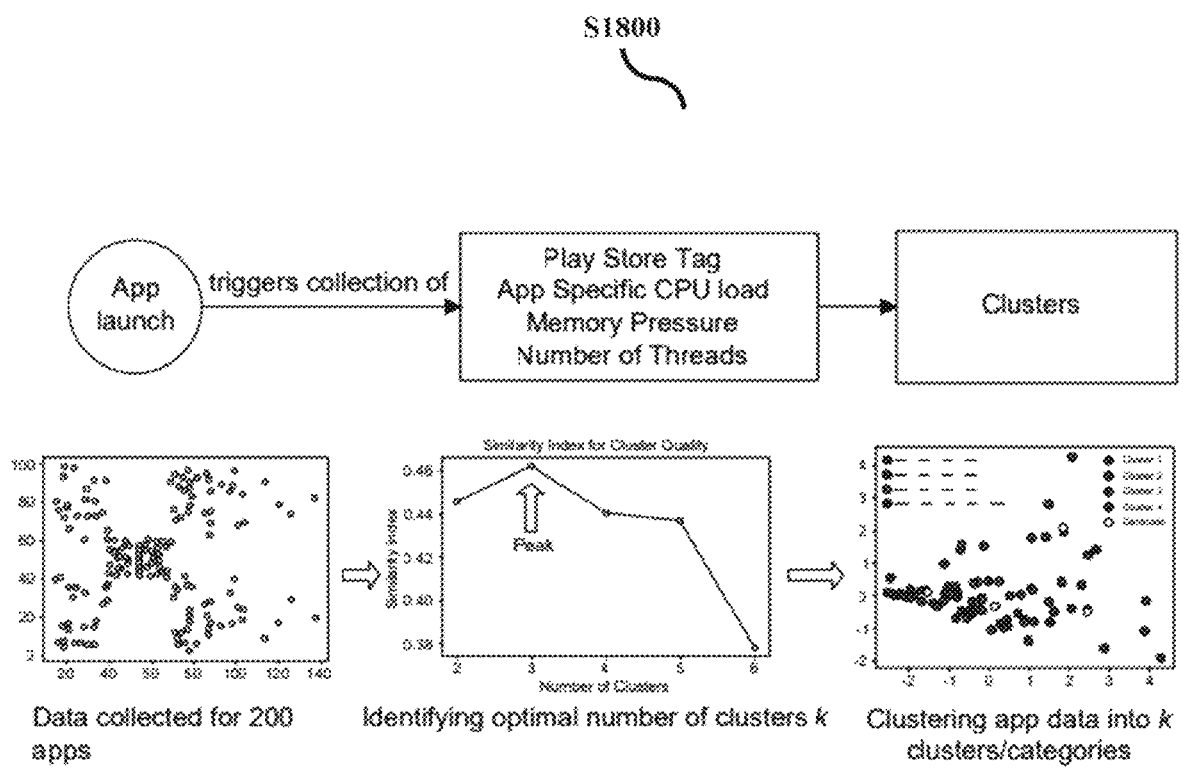
FIG. 18 is an example scenario in which an App category clustering model (ACM) is depicted, according to an embodiment of the disclosure.

FIG. 18 is an example scenario in which an App category clustering model (ACM) is depicted, according to an embodiment of the disclosure.

Referring to FIG. 18, at scenario S1800, the ACM classifies the apps according to the CPU load, memory and PlayStore tag which form the weighting factor for determining boost interval. Average Silhouette Coefficient is calculated for different number of clusters k. The k which maximizes silhouette coefficient is the optimal number of clusters for the given data. Spectral Clustering is done to classify the apps into k clusters. After learning cluster centroid positions in offline model training, prediction of app category is done using closest distance from these cluster centroids of the app being launched.

Figure 19:
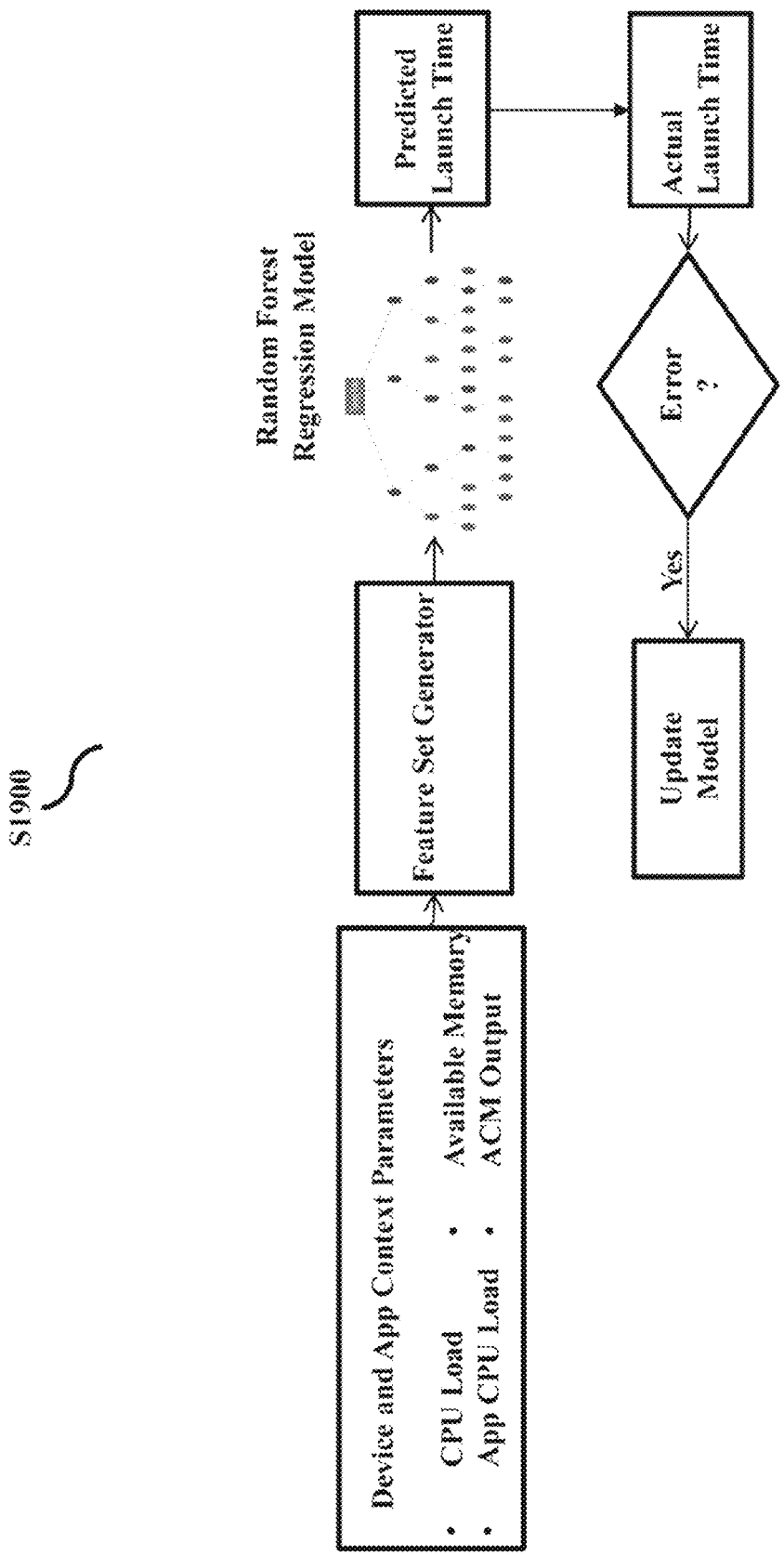
FIG. 19 is an example scenario in which an App launch prediction module is depicted, according to an embodiment of the disclosure.

FIG. 19 is an example scenario in which an App launch prediction module is depicted, according to an embodiment of the disclosure.

Referring to FIG. 19, at scenario S1900, the App launch prediction module is used for predicting the application launch time until 'Fully Drawn' state. The proposed method uses the Random Forest Regression model to predict the application launch based on the collected System parameters like CPU load, Available memory, Disk Usage etc.

Figure 20:
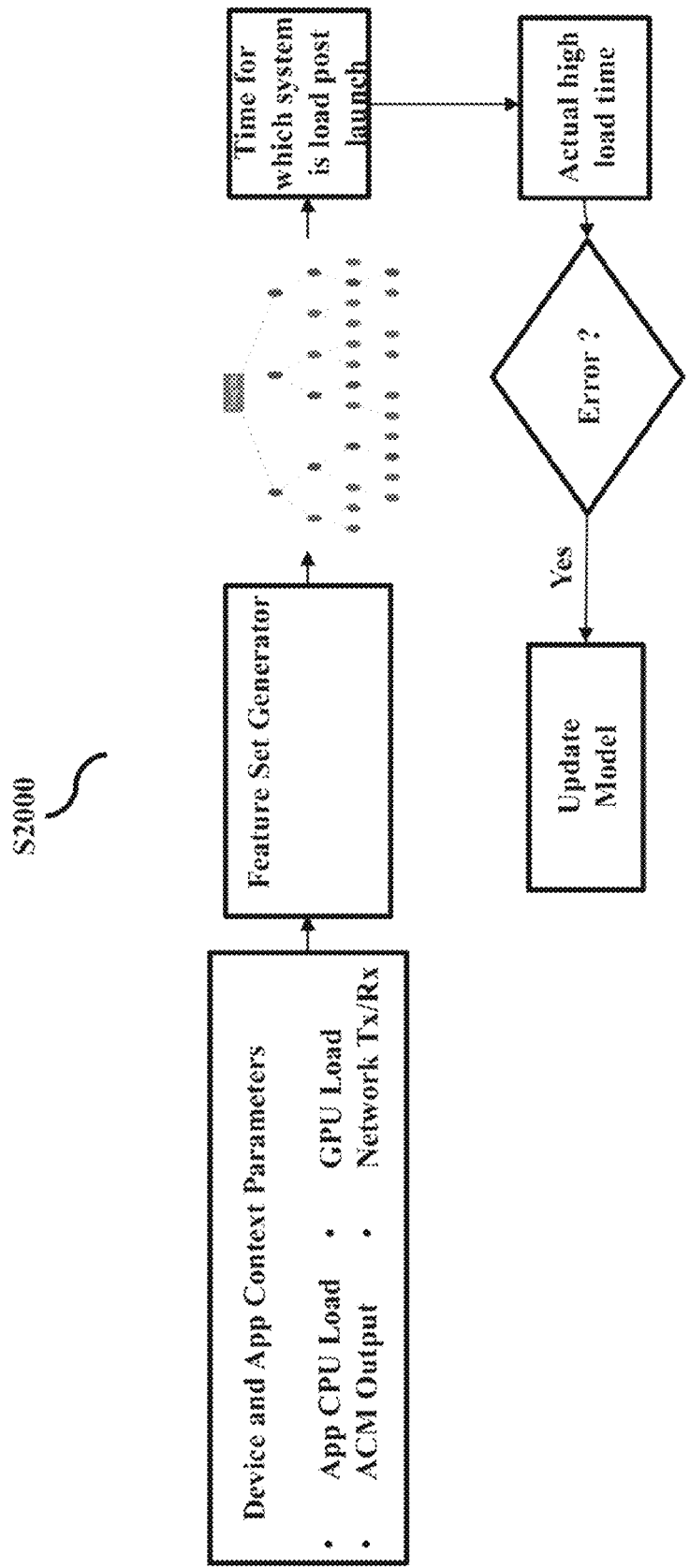
FIG. 20 is an example scenario in which a post launch prediction module is depicted, according to an embodiment of the disclosure.

FIG. 20 is an example scenario in which a post launch prediction module is depicted, according to an embodiment of the disclosure.

Referring to FIG. 20, at scenario S2000, the Post Launch Prediction module (PLP) predicts the time taken by the app to do processor intensive operations once the launch is complete. Random Forest Regression model is used based on the collected System Parameters like GPU Load and App Specific CPU load.

For the random search, the hyper-parameters are tuned using Random Search techniques to find the optimal set of values. The combinations to be evaluated are sampled uniformly from the set of all possible combinations. So for the same number of iterations, it samples a better representation of the entire search space. In case of parameters with a continuous domain, it samples from a uniform distribution over the domain, making coverage more extensive.

Figure 21:
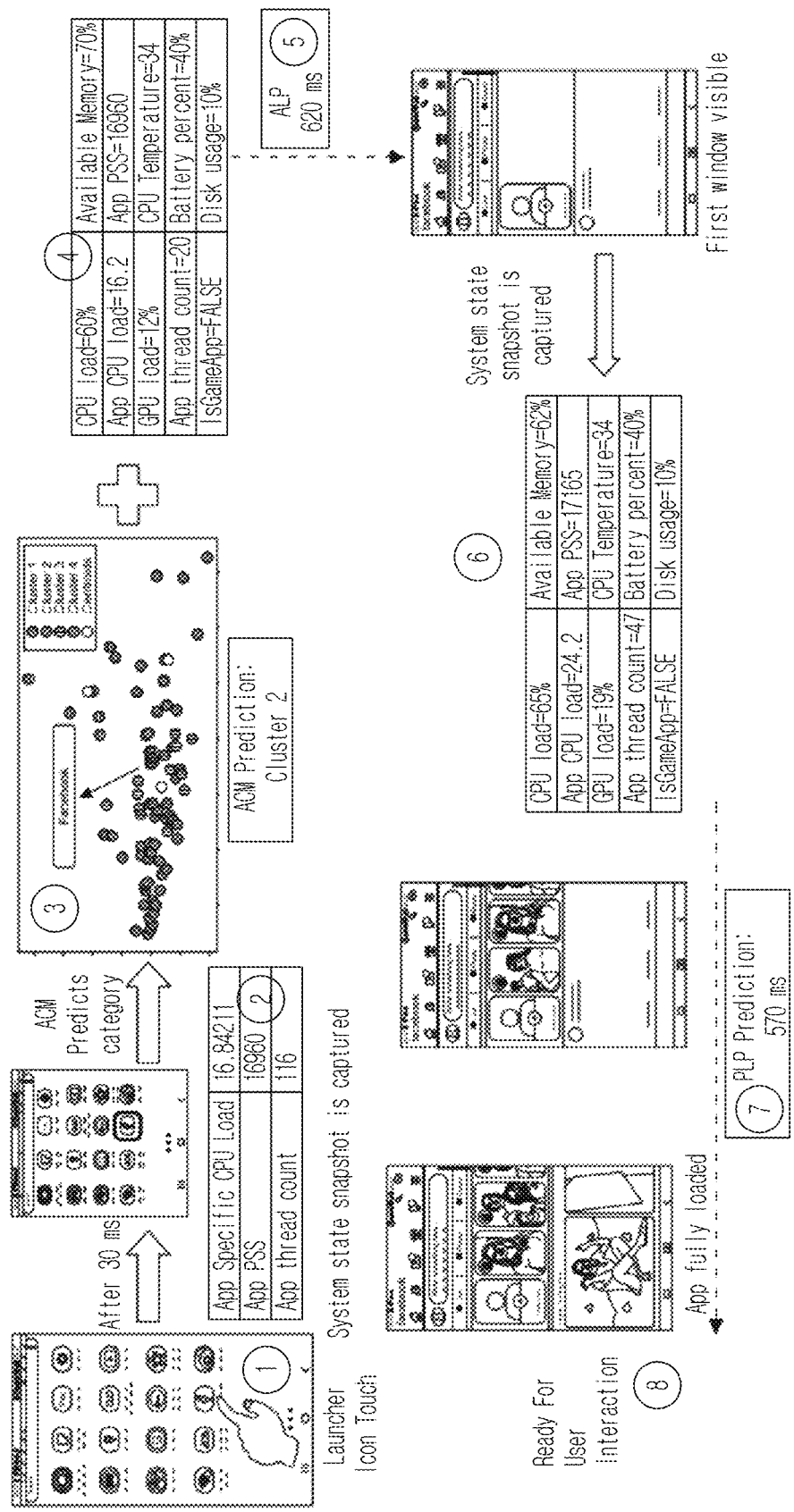
FIG. 21 is an example scenario in which an AI model with app launch time prediction model (ALP) & post launch processing time prediction (PLP) predictions are depicted, according to an embodiment of the disclosure.

FIG. 21 is an example scenario in which the AI model with ALP & PLP predictions are depicted, according to an embodiment of the disclosure.

Referring to FIG. 21, at scenario S2100, at step 1, the user of the electronic device 100 input on the application. At step 2, the system state snapshot is captured based on the input. At step 3, the ACM prediction is done. At steps 4 and 5, ALP is predicted. At steps 6 and 7, the PLP prediction is done. At step 8, the application is loaded fully and ready for the interaction.

Figure 22:
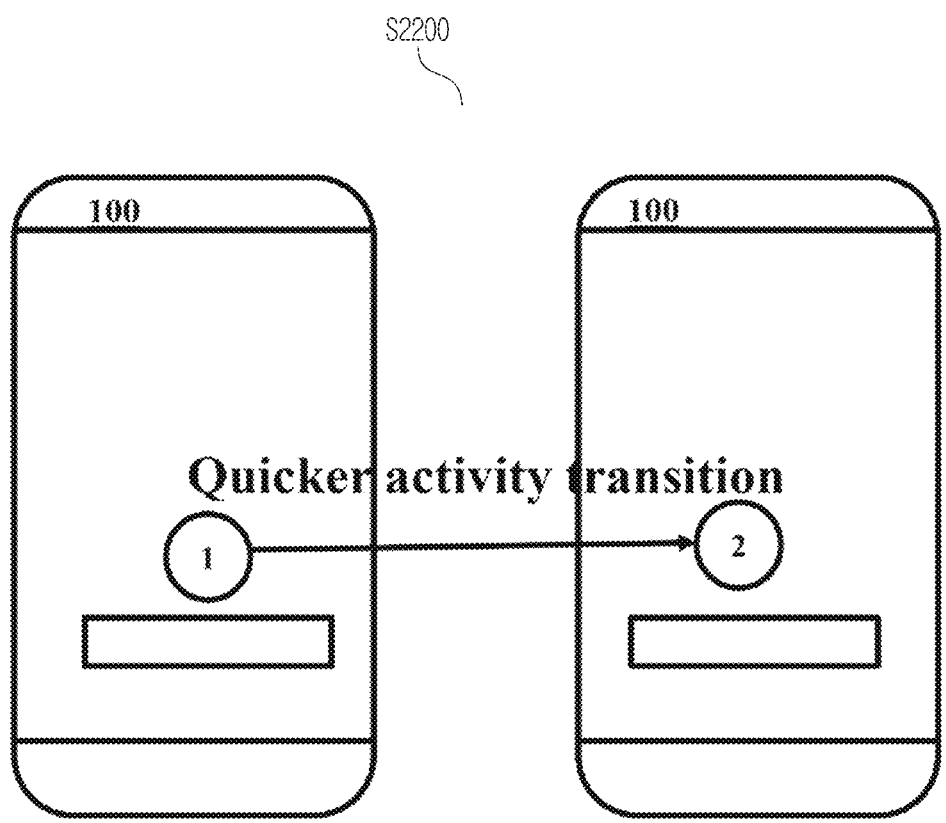
FIG. 22 is an example scenario in which a quicker activity transition is depicted, according to an embodiment of the disclosure.

FIG. 22 is an example scenario in which a quicker activity transition is depicted, according to an embodiment of the disclosure.

Referring to FIG. 22, at operation S2200, The proposed method may be extended for activity transitions within the same application. The proposed method may be used to predict the duration of activity transition and boost for the appropriate duration, so as to result in faster rendering of UI for the user.

Figure 23:
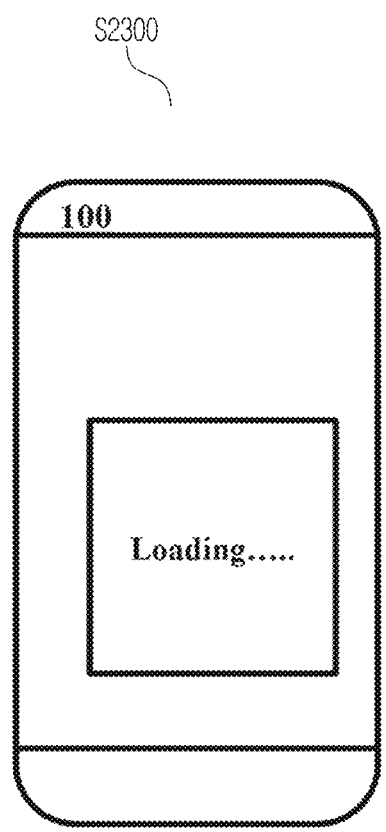
FIG. 23 is an example scenario in which a boot time improvement is depicted, according to an embodiment of the disclosure.

FIG. 23 is an example scenario in which a boot time improvement is depicted, according to an embodiment of the disclosure.

Referring to FIG. 23, at scenario S2300, the boot time would vary on each device depending on the chipset capabilities. PLP model may be used to learn and predict the boot time irrespective of the chipset of the electronic device 100. The boosting may be done at boot time depending on the duration predicted by the PLP model.

Figure 24:
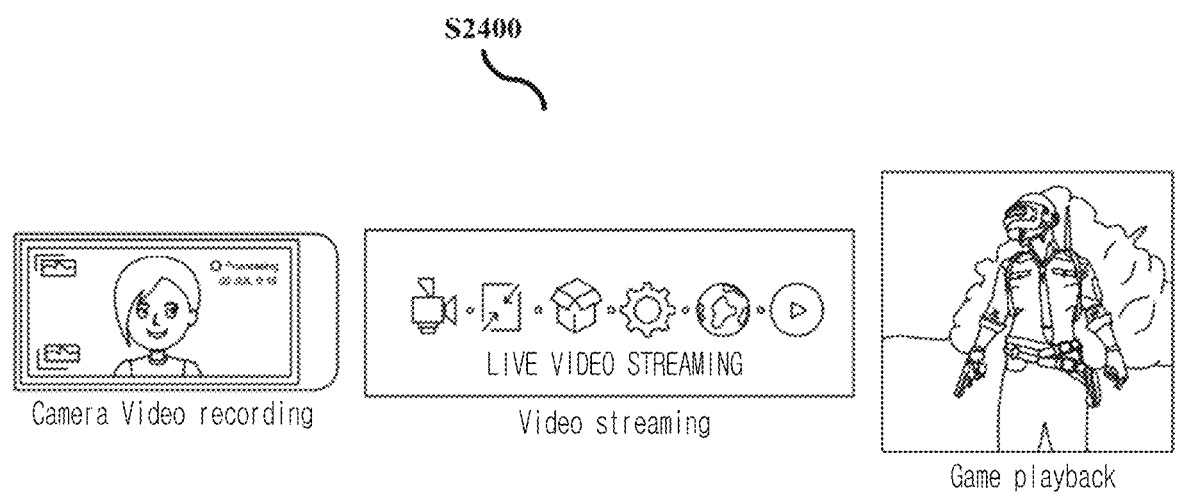
FIG. 24 is an example scenario in which an enhanced video recording/playback is depicted, according to an embodiment of the disclosure.

FIG. 24 is an example scenario in which an enhanced video recording/playback is depicted, according to an embodiment of the disclosure.

The video recording/playback is a use case that involves a lot of CPU/GPU. The PLP could be used to predict the usage of resources and boosting could be done appropriately.

Figure 25:
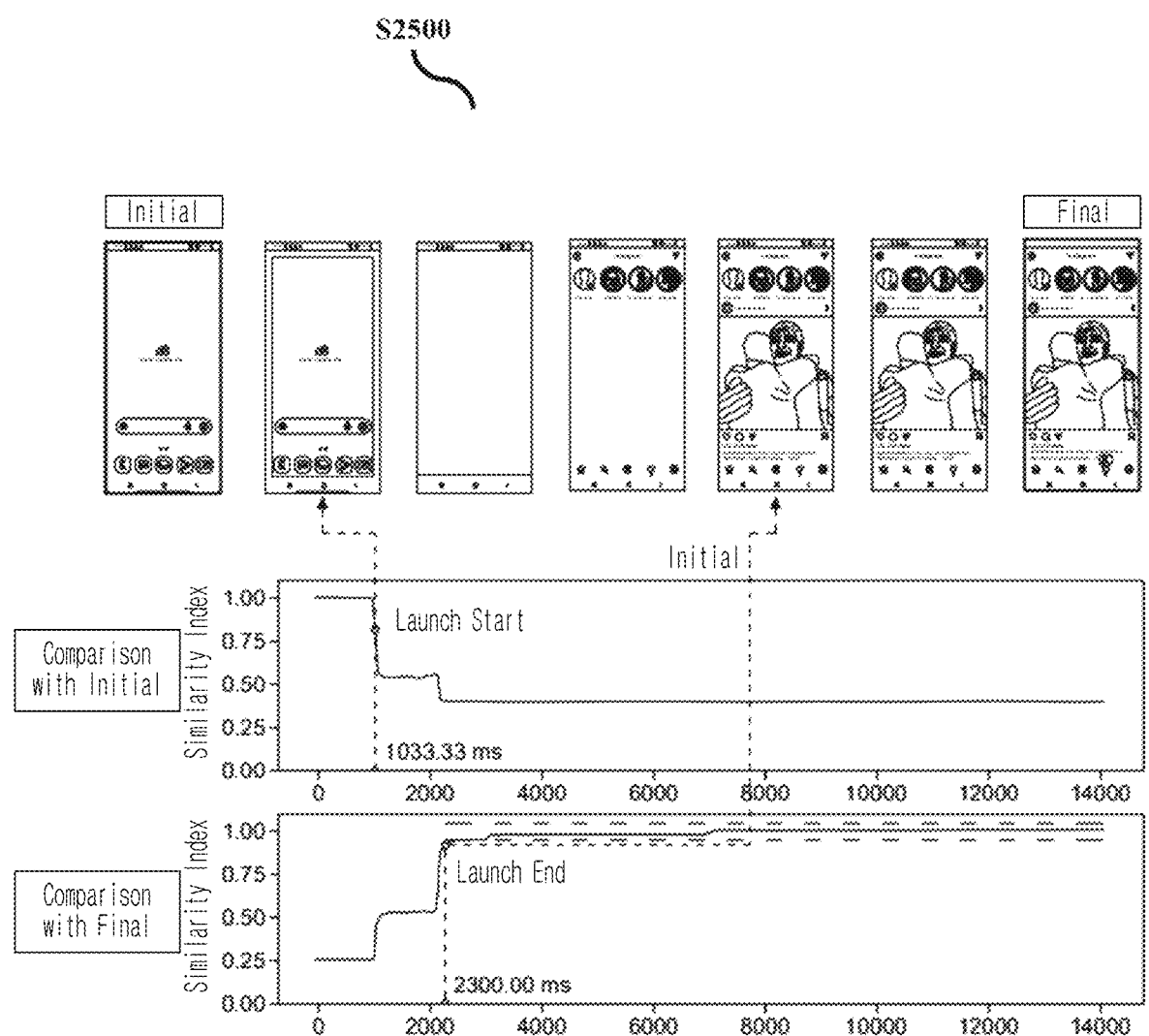
FIG. 25 is an example illustration in which a video tool computes a user-perceived launch time (UPLT) of an application, according to an embodiment of the disclosure.

FIG. 25 is an example illustration in which a video tool computes the user-perceived launch time (UPLT) of an application, according to an embodiment of the disclosure.

Referring to FIG. 25, at scenario S2500, the video tool has been designed to compute the user-perceived launch time (UPLT) of the application. The Launch Start Time (LST) and Launch End Time (LET) are calculated by comparing the video frames with the initial and final frame respectively. The time stamps of LST and LET are calculated when the similarity index of the two frames meets the required conditions of the respective threshold values. The launch time as per tool is the difference between LST and LET. LST=1033.33 ms, LET=2300 ms. Hence, UPLT=LET−LST=2300−1033.33=1266.7 ms.

The launch start time is set when the image similarity with initial frame drops below launch start similarity threshold. The launch end time is set when the image similarity with final frame reaches above launch end similarity threshold, and stays within an error margin till the end. The error margin is set to account for fluctuations in similarity with final frame due to updates on the final screen after app launch is over.

Referring to FIG. 25, the video tool has been designed to calculate the user-perceived launch time (UPLT) of the application. The Launch Start Time (LST) and Launch End Time (LET) is calculated by comparing the video frames with the initial and final frame respectively. The time stamps of LST and LET are calculated based on the app type. The launch time as per tool is the difference between LST and LET. Hence, the proposed method avoids the static loading screen effect and the loading time of the social networking application connected to the network.

Figure 26:
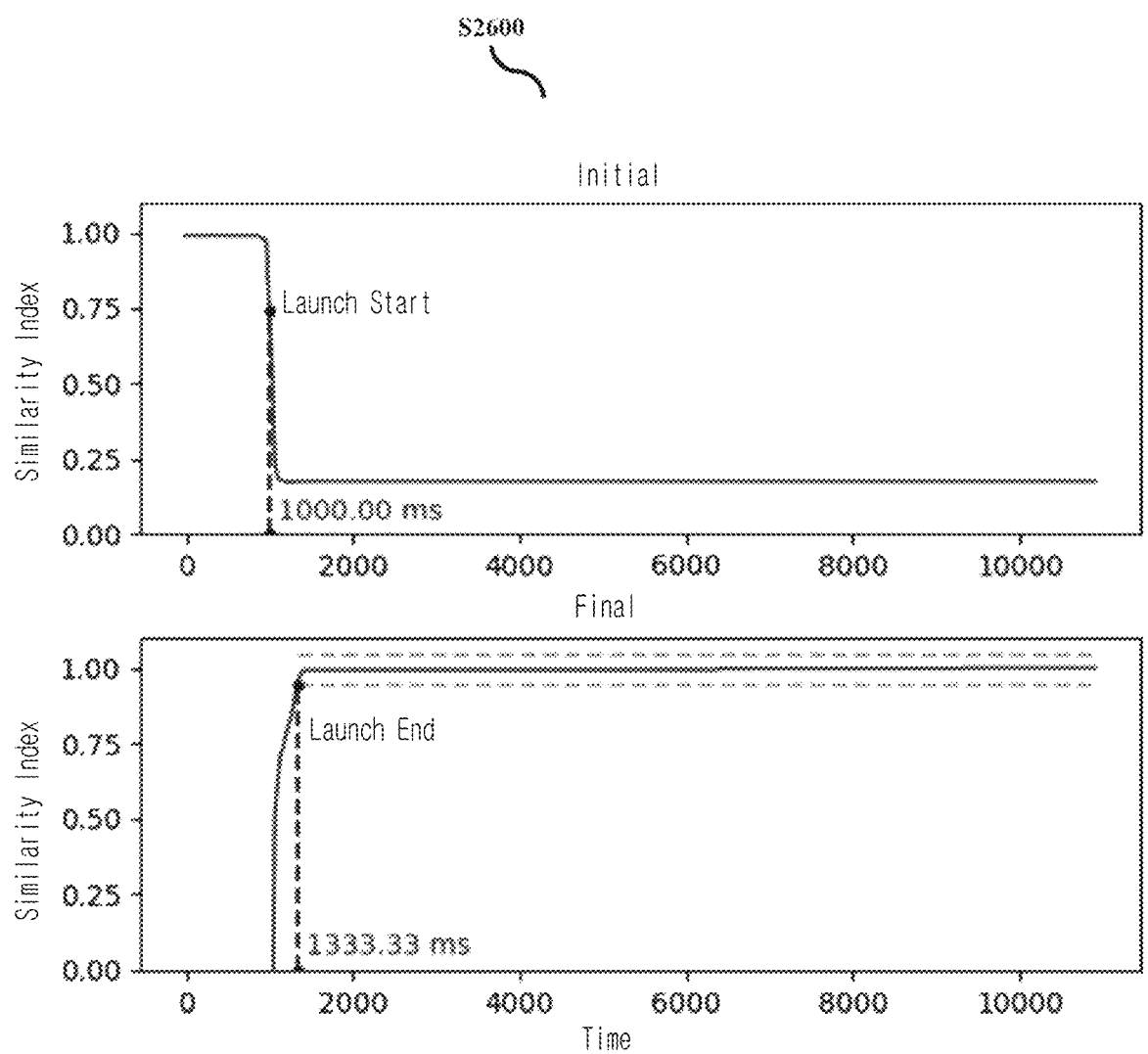
FIG. 26 is an example scenario in which settings application similarity plots is depicted, according to an embodiment of the disclosure.
Figure 27A:
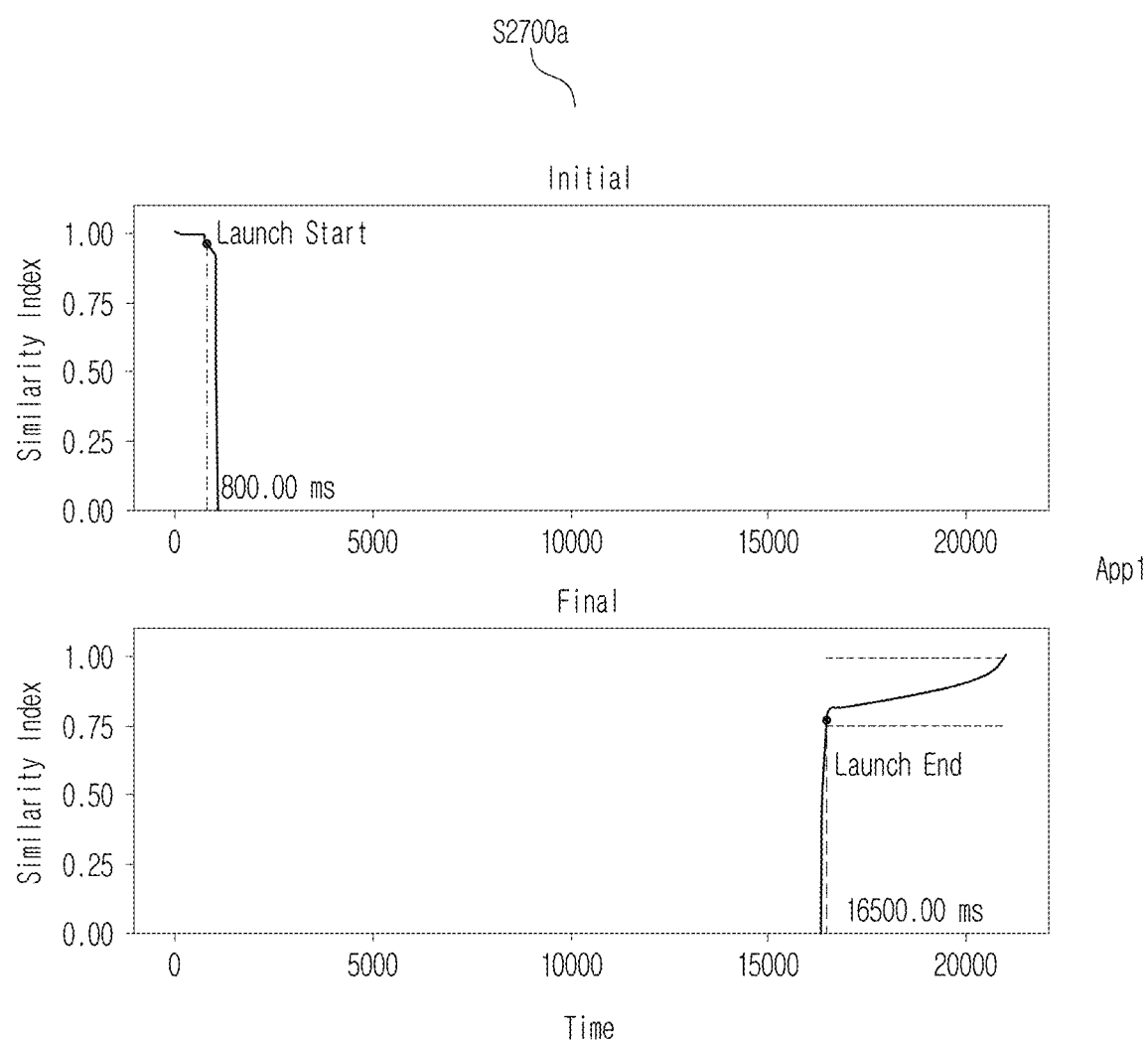
FIGS. 27A, 27B, 27C, 27D, 27E, and 27F are example scenarios in which UPLT associated with animations on a final screen are depicted, according to various embodiments of the disclosure.
Figure 27B:
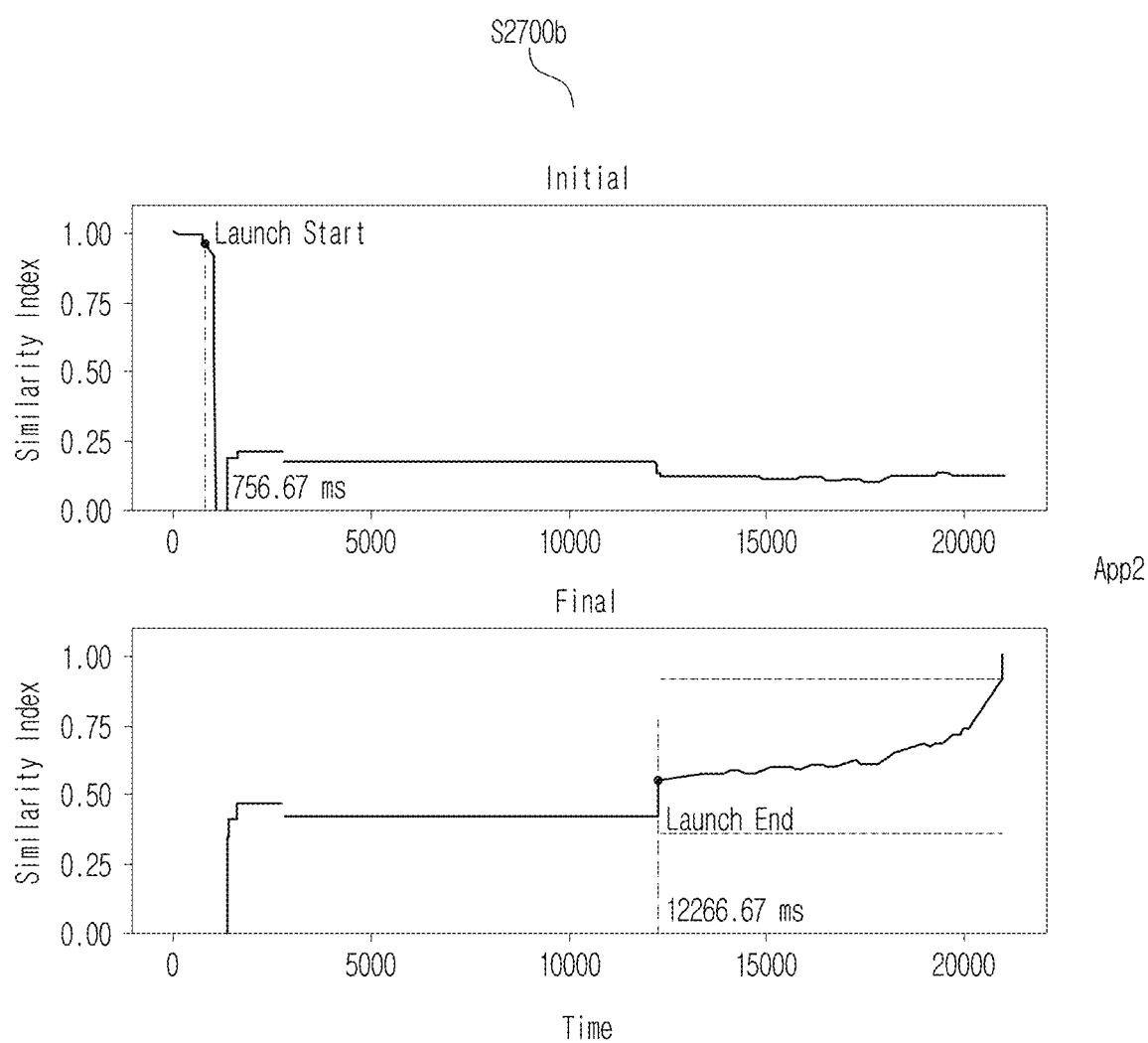
Figure 27C:
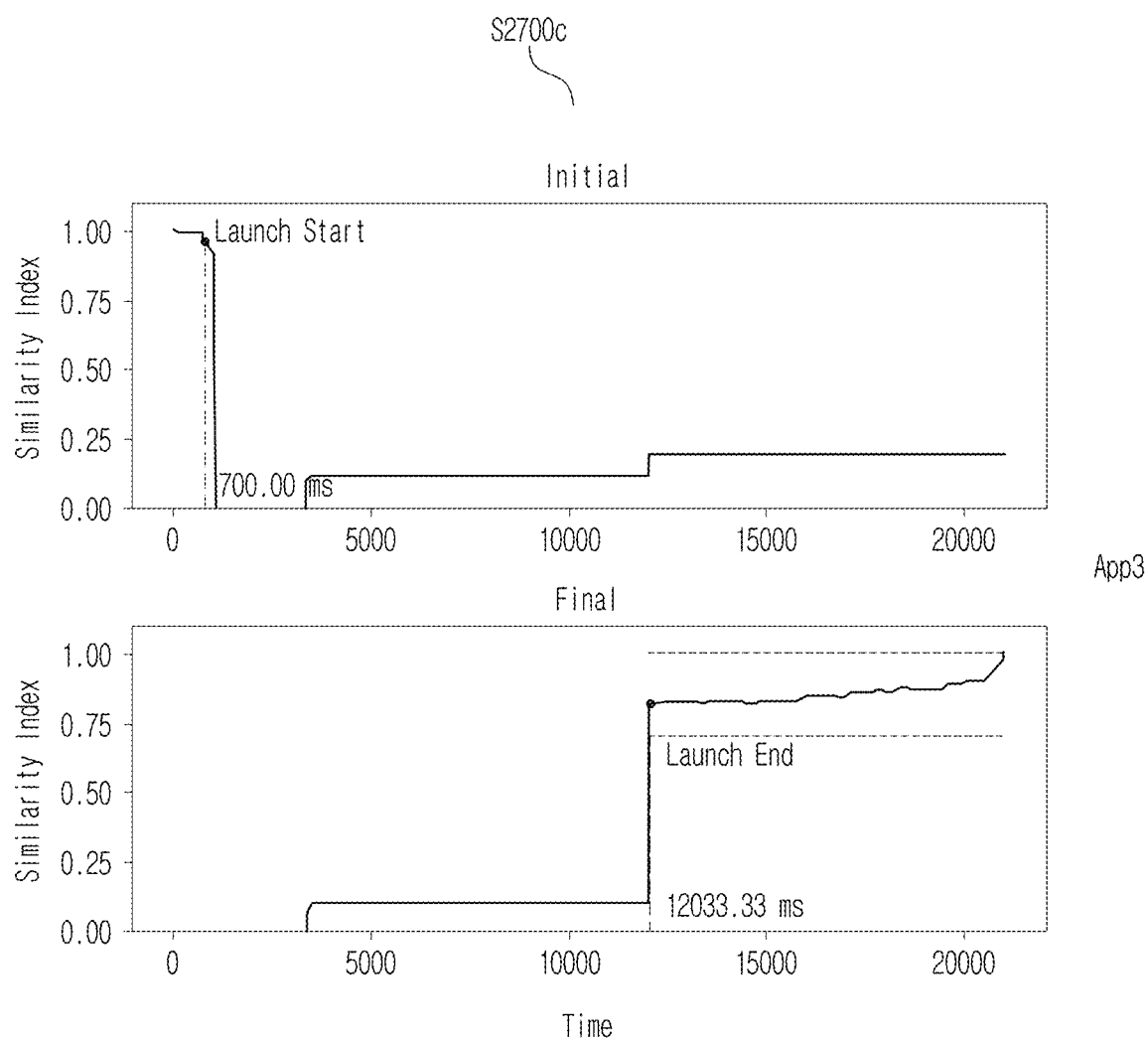
Figure 27D:
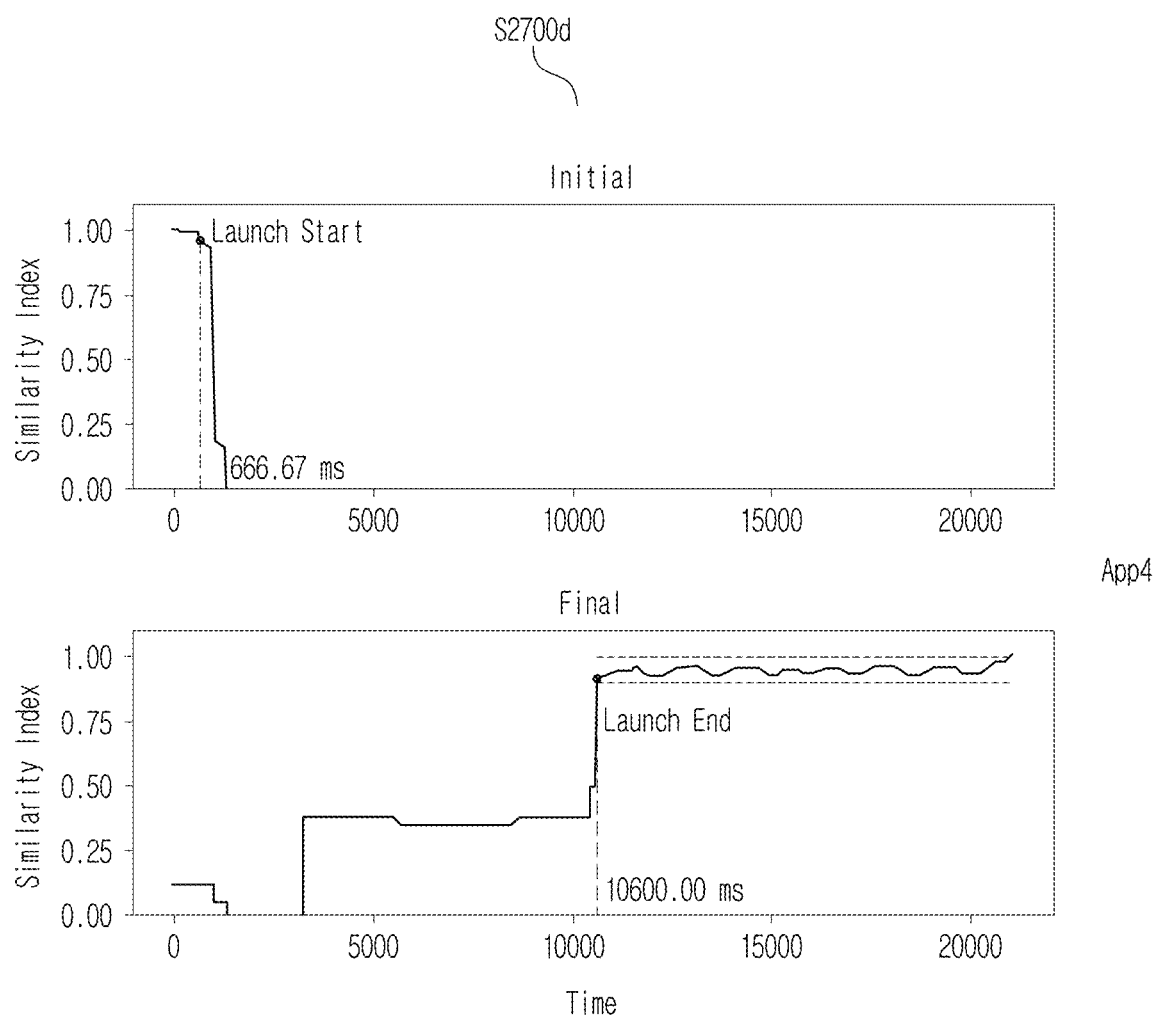
Figure 27E:
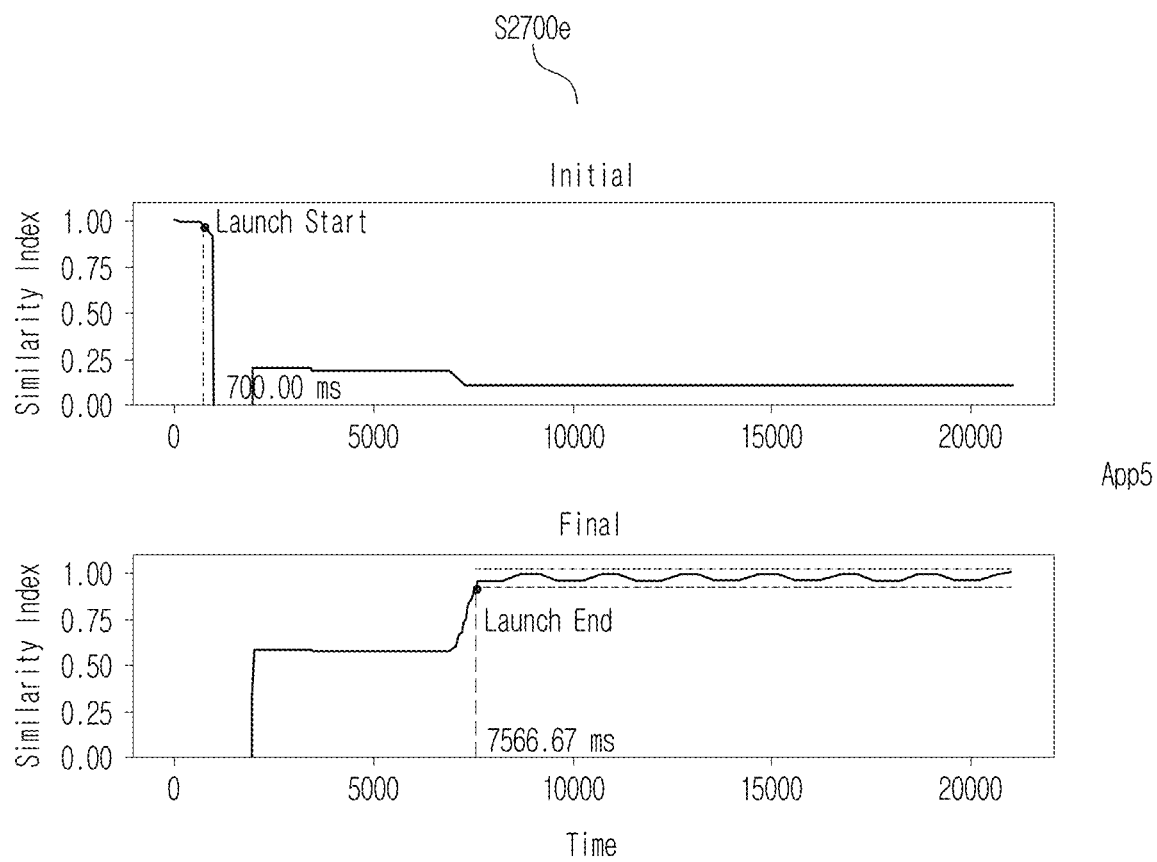
Figure 27F:
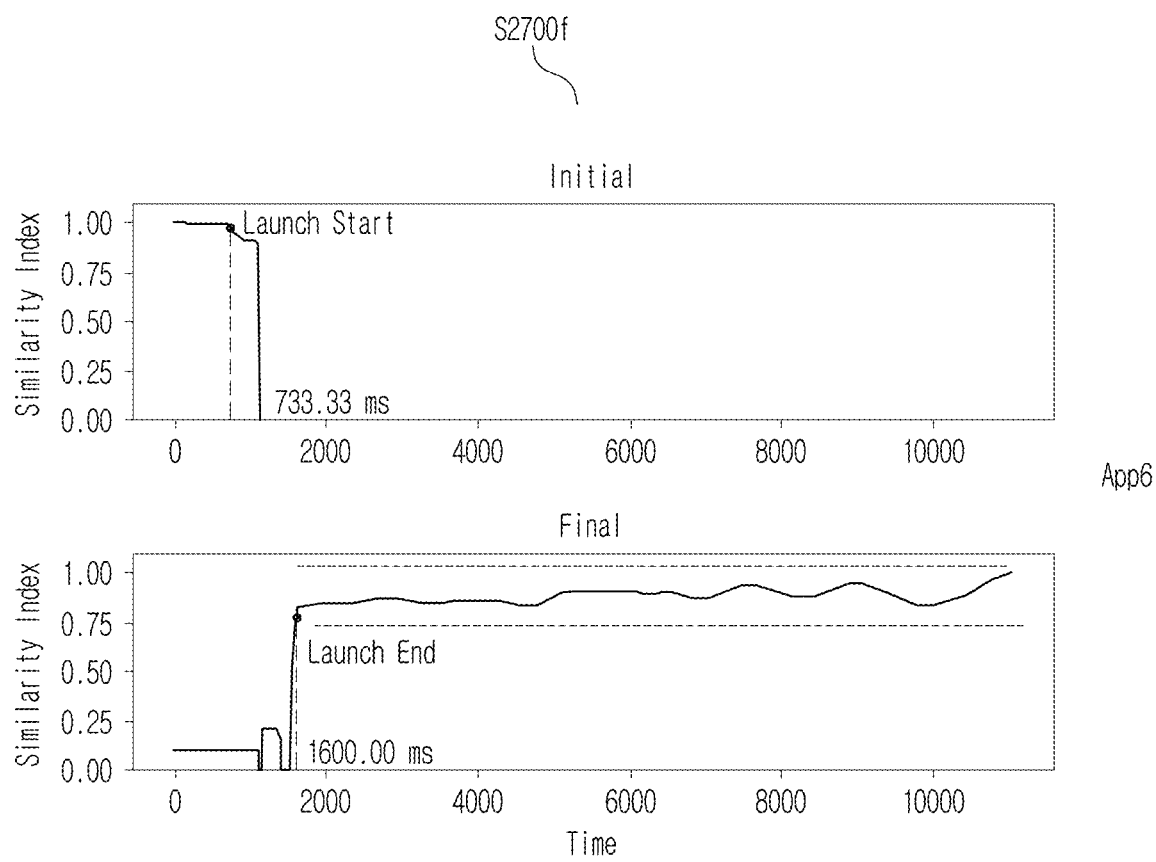

FIG. 26 is an example scenario in which settings application similarity plots is depicted, according to an embodiment of the disclosure.

Referring to FIG. 26, at scenario S2600, the launch start time is set when the image similarity with initial frame drops below 1. The launch end time is set as the first point where the image similarity with final frame reaches 1. The launch start time is set to 1000 ms, because that is the first point where similarity with initial frame drops below 1. The launch end time is set to 1333 ms, because that is the first point where similarity with final frame reaches 1. Hence, the launch time is calculated as 1333−1000=333 ms.

FIGS. 27A, 27B, 27C, 27D, 27E, and 27F are example scenarios in which UPLT associated with the animations on the final screen is depicted, according to various embodiments of the disclosure.

Referring to FIGS. 17A-27F, in scenarios S2700a-S2700f For the various applications (App1-App3), the launch end time is set as the start point of the section where the image similarity with final frame starts increasing. The launch end point is set to 16500 ms for app1, 12266 ms for App2, and 12033 ms for App3 because after these points, similarity with final frame continuously increases.

For the various applications (App4-App6), the launch end time is set as the start point of the section where the image similarity with the final frame shows a sinusoidal trend. The launch end point is set to 10600 ms for App4, 7566 ms for App5, and 1600 ms for App6 because after those points, similarity with final frame varies in sinusoidal fashion.

The various actions, acts, blocks, steps, or the like in the flow charts scenarios S1400 to S1600 may be performed in the order presented, in a different order or simultaneously. Further, in some embodiments, some of the actions, acts, blocks, steps, or the like may be omitted, added, modified, skipped, or the like without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing a boost time required for an application launch in an electronic device, the method comprising:
   detecting, by the electronic device, a user input to launch the application running in the electronic device;
   measuring, by the electronic device, real-time system health parameters of the electronic device;
   predicting, by the electronic device, an application launch time by inputting the real-time system health parameters to an artificial intelligence (AI)-based application prediction model; and
   boosting, by the electronic device, at least one hardware of the electronic device based on the predicted application launch time,
   wherein the method further comprises training the AI-based application prediction model by:
      obtaining, by the electronic device, screen frames of the electronic device for a plurality of application launches while at least one application of a plurality of applications is launched at the electronic device;
      determining, by the electronic device, a plurality of system health parameters of the electronic device while at least one application of the plurality of applications is launched at the electronic device;
      determining, by the electronic device, an application launch time of the at least one application based on the screen frames of the electronic device and the plurality of system health parameters; and
      training, by the electronic device, the AI-based application prediction model with the determined application launch time and the plurality of system health parameters of the electronic device, and
   wherein the determining, by the electronic device, of the application launch time of the at least one application for each of the application launch comprises:
      determining, by the electronic device, a launch start time (LST) by comparing the screen frames of the electronic device with an initial frame of the electronic device for each application launch of the plurality of application launches;
      determining, by the electronic device, a launch end time (LET) by comparing the screen frames of the electronic device with a final frame of the electronic device for each application launch of the plurality of application launches;
      determining, by the electronic device, a difference between the LST and the LET; and
      determining, by the electronic device, the application launch time of the at least one application for each of the application launch based on the difference between the LST and the LET.

2. The method as claimed in claim 1,
   wherein the boosting, by the electronic device, of the at least one hardware of the electronic device based on the predicted application launch time comprises increasing a frequency of the at least one hardware of the electronic device for the predicted application launch time to optimize the boost time for subsequent application launches, and
   wherein the at least one hardware of the electronic device comprises a central processing unit (CPU) of the electronic device, a graphics processing unit (GPU) of the electronic device and a bus of the electronic device.

3. The method as claimed in claim 1, wherein the obtaining, by the electronic device, of the screen frames of the electronic device for the plurality of application launches comprises:
   detecting, by the electronic device, an input to launch at least one application from the plurality of applications at the electronic device;
   recording, by the electronic device, a video of a screen of the electronic device while the at least one application is launched at the electronic device; and
   converting, by the electronic device, the video into the screen frames by applying a fixed frame rate on a plurality of frames available in the video.

4. The method as claimed in claim 1,
   wherein the LST is determined when a similarity between the screen frames with the initial frame reaches a predefined threshold, and
   wherein the LET is determined when a similarity between the screen frames with the final frame reaches a predefined threshold.

5. The method as claimed in claim 1, wherein the plurality of system health parameters comprises at least one of:
   a CPU load of the electronic device, a CPU temperature of the electronic device while the at least one application of the plurality of applications is launched at the electronic device;
   a GPU load of the electronic device, a GPU temperature of the electronic device while the at least one application of the plurality of applications is launched at the electronic device;
   a skin temperature of the electronic device while the at least one application of the plurality of applications is launched at the electronic device;
   a battery level of the electronic device while the at least one application of the plurality of applications is launched at the electronic device;
   a battery temperature of the electronic device while the at least one application of the plurality of applications is launched at the electronic device;
   an ultra power saving mode (UPSM) of the electronic device while the at least one application of the plurality of applications is launched at the electronic device;
   application information of the electronic device while the at least one application of the plurality of applications is launched at the electronic device;
   a type of the at least one application, a memory utilization level of the electronic device while the at least one application of the plurality of applications is launched at the electronic device;
   a type of network used at the electronic device while the at least one application of the plurality of applications is launched at the electronic device;
   a transmitting (Tx) rate while the at least one application of the plurality of applications is launched at the electronic device;
   a receiving (Rx) rate of the electronic device while the at least one application of the plurality of applications is launched at the electronic device;
   an application memory level of the electronic device while the at least one application of the plurality of applications is launched at the electronic device;
   an application thread count of the electronic device while the at least one application of the plurality of applications is launched at the electronic device; or
   a disk usage of the electronic device while the at least one application of the plurality of applications is launched at the electronic device.

6. The method as claimed in claim 1, wherein the real-time system health parameters of the electronic device comprises at least one of:
   a current CPU load of the electronic device;
   a current CPU temperature of the electronic device;
   a current GPU load of the electronic device;
   a current GPU temperature of the electronic device;
   a current skin temperature of the electronic device;
   a current battery level of the electronic device;
   a current battery temperature of the electronic device;
   a current ultra power saving mode (UPSM) mode of the electronic device;
   a current application information of the electronic device;
   a type of applications running in the electronic device;
   a current memory utilization level of the electronic device;
   a type of current network used at the electronic device;
   a current Tx rate of the electronic device;
   a current Rx rate of the electronic device;
   a current application memory level of the electronic device;
   a current application thread count of the electronic device; or
   a current disk usage of the electronic device.

7. The method as claimed in claim 1, wherein the method further comprises:
   determining, by the electronic device, an actual launch time of subsequent applications;
   determining, by the electronic device, whether an actual application launch time of the subsequent applications matches with the predicted application launch time; and
   updating, by the electronic device, the AI-based application prediction model in response to determining that the actual application launch time of the subsequent applications does not matches with the predicted application launch time.

8. An electronic device for optimizing a boost time required for an application launch in the electronic device, the electronic device comprising:
   a memory;
   a processor; and
   an application launch time booster, communicatively coupled to the memory and the processor, configured to:
      detect a user input to launch the application,
      measure real-time system health parameters of the electronic device,
      predict an application launch time by inputting the real-time system health parameters to an artificial intelligence (AI)-based application prediction model, and
      boost at least one hardware of the electronic device based on the predicted application launch time,
   wherein, in order to train the AI-based application prediction model, the application launch time booster is further configured to:
      obtain screen frames of the electronic device for a plurality of application launches while at least one application of a plurality of applications is launched at the electronic device,
      determine a plurality of system health parameters of the electronic device while at least one application of the plurality of applications is launched at the electronic device,
      determine an application launch time of the at least one application based on the screen frames of the electronic device and the plurality of system health parameters, and
      train the AI-based application prediction model with the determined application launch time and the plurality of system health parameters of the electronic device, and
   wherein, when determining the application launch time of the at least one application for each of the application launch, the application launch time booster is further configured to:
      determine a launch start time (LST) by comparing the screen frames of the electronic device with an initial frame of the electronic device for each application launch of the plurality of application launches,
      determine a launch end time (LET) by comparing the screen frames of the electronic device with a final frame of the electronic device for each application launch of the plurality of application launches,
      determine a difference between the LST and the LET, and
      determining the application launch time of the at least one application for each of the application launch based on the difference between the LST and the LET.

9. The electronic device as claimed in claim 8,
   wherein the boost of the at least one hardware of the electronic device based on the predicted application launch time comprises increasing a frequency of the at least one hardware of the electronic device for the predicted application launch time to optimize the boost time for subsequent application launches, and
   wherein the at least one hardware of the electronic device comprises:
      a central processing unit (CPU) of the electronic device,
      a graphics processing unit (GPU) of the electronic device, and
      a bus of the electronic device.

10. The electronic device as claimed in claim 8, wherein, when obtaining the screen frames of the electronic device for the plurality of application launches, the application launch time booster is further configured to:
   detect an input to launch at least one application from the plurality of applications at the electronic device,
   record a video of a screen of the electronic device while the at least one application is launched at the electronic device, and
   convert the video into the screen frames by applying a fixed frame rate on a plurality of frames available in the video.

11. The electronic device as claimed in claim 8,
   wherein the LST is determined when a similarity between the screen frames with the initial frame reaches a predefined threshold, and
   wherein the LET is determined when a similarity between the screen frames with the final frame reaches a predefined threshold.

12. The electronic device as claimed in claim 8, wherein the plurality of system health parameters comprises at least one of:
   a CPU load of the electronic device, a CPU temperature of the electronic device while the at least one application of the plurality of applications is launched at the electronic device;

a GPU load of the electronic device, a GPU temperature of the electronic device while the at least one application of the plurality of applications is launched at the electronic device;

a skin temperature of the electronic device while the at least one application of the plurality of applications is launched at the electronic device;

a battery level of the electronic device while the at least one application of the plurality of applications is launched at the electronic device;

a battery temperature of the electronic device while the at least one application of the plurality of applications is launched at the electronic device;

an ultra power saving mode (UPSM) mode of the electronic device while the at least one application of the plurality of applications is launched at the electronic device;

application information of the electronic device while the at least one application of the plurality of applications is launched at the electronic device;

a type of the at least one application, a memory utilization level of the electronic device while the at least one application of the plurality of applications is launched at the electronic device;

a type of network used at the electronic device while the at least one application of the plurality of applications is launched at the electronic device;

a transmitting (Tx) rate while the at least one application of the plurality of applications is launched at the electronic device;

a receiving (Rx) rate of the electronic device while the at least one application of the plurality of applications is launched at the electronic device;

an application memory level of the electronic device while the at least one application of the plurality of applications is launched at the electronic device;

an application thread count of the electronic device while the at least one application of the plurality of applications is launched at the electronic device; or a disk usage of the electronic device while the at least one application of the plurality of applications is launched at the electronic device.

13. The electronic device as claimed in claim 8, wherein the real-time system health parameters of the electronic device comprises at least one of:

a current CPU load of the electronic device;
a current CPU temperature of the electronic device;
a current GPU load of the electronic device;
a current GPU temperature of the electronic device;
a current skin temperature of the electronic device;
a current battery level of the electronic device;
a current battery temperature of the electronic device;
a current UPSM mode of the electronic device;
a current application information of the electronic device;
a type of applications running in the electronic device;
a current memory utilization level of the electronic device;
a type of current network used at the electronic device;
a current Tx rate of the electronic device;
a current Rx rate of the electronic device;
a current application memory level of the electronic device;
a current application thread count of the electronic device; or
a current disk usage of the electronic device.

14. The electronic device as claimed in claim 8, wherein the application launch time booster is further configured to:

determine an actual launch time of subsequent applications, determine whether an actual application launch time of the subsequent applications matches with the predicted application launch time, and update the AI-based application prediction model in response to determining that the actual application launch time of the subsequent applications does not matches with the predicted application launch time.

* * * * *